US012365052B2

(12) United States Patent
Dessart et al.

(10) Patent No.: US 12,365,052 B2
(45) Date of Patent: *Jul. 22, 2025

(54) SMART MANIFOLDS FOR WELDING-TYPE SYSTEMS

(71) Applicant: Illinois Tool Works Inc., Glenview, IL (US)

(72) Inventors: Nicholas James Dessart, Neenah, WI (US); Alan Adam Manthe, New London, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/650,788

(22) Filed: Apr. 30, 2024

(65) Prior Publication Data

US 2024/0286227 A1 Aug. 29, 2024

Related U.S. Application Data

(63) Continuation of application No. 16/815,761, filed on Mar. 11, 2020, now Pat. No. 12,011,786.

(51) Int. Cl.
*B23K 31/02* (2006.01)
*B23K 31/00* (2006.01)
*F17C 13/02* (2006.01)

(52) U.S. Cl.
CPC ............ *B23K 31/02* (2013.01); *F17C 13/025* (2013.01); *B23K 31/00* (2013.01);
(Continued)

(58) Field of Classification Search
CPC ...... B23K 31/02; B23K 9/0953; B23K 31/00; B23K 9/0956; B23K 9/1087; B23K 9/16;
(Continued)

(56) References Cited

U.S. PATENT DOCUMENTS

| 3,791,813 A | 2/1974 | Ramachandran |
| 4,645,903 A * | 2/1987 | De Vito ................... B23K 9/16 |
| | | 219/137 R |

(Continued)

FOREIGN PATENT DOCUMENTS

| AU | 2018100195 | 3/2018 |
| CN | 1200060 | 11/1998 |

(Continued)

OTHER PUBLICATIONS

RU-66255-U1 English Translation of Specification (Year: 2024).*

(Continued)

*Primary Examiner* — Kenneth Rinehart
*Assistant Examiner* — Stephanie A Shrieves
(74) *Attorney, Agent, or Firm* — McAndrews, Held & Malloy, Ltd.

(57) ABSTRACT

Systems and apparatus are disclosed relating to smart regulators and smart manifolds for welding-type systems. A smart regulator may be coupled to a fluid tank and provide information regarding the current pressure(s) and/or flow rate to a remote device and/or operator. The remote device may also determine and/or output additional information, such as, for example, remaining fluid and/or remaining time before the fluid runs out or becomes dangerously low. A smart manifold may be configured to work with several different fluid supplies. In this way, an operator may easily mix fluid types, switch between different fluid types, and/or switch between different fluid tanks.

20 Claims, 10 Drawing Sheets

(52) U.S. Cl.
CPC ..... *F17C 2205/0146* (2013.01); *F17C 2250/032* (2013.01); *F17C 2250/0626* (2013.01)

(58) Field of Classification Search
CPC .......... B23K 9/325; B23K 9/133; B23K 9/32; F17C 13/025; F17C 2205/0146; F17C 2250/032; F17C 2250/0626; F17C 2270/0545
USPC .......................................................... 219/74
See application file for complete search history.

(56) References Cited

U.S. PATENT DOCUMENTS

| | | | |
|---|---|---|---|
| 4,749,841 A | 6/1988 | Galantino | |
| 4,871,898 A | 10/1989 | Cherne | |
| 4,902,866 A * | 2/1990 | Galantino | B23K 9/16 219/136 |
| 5,234,148 A * | 8/1993 | Stone | G05D 11/06 228/8 |
| 5,291,423 A | 3/1994 | Roeoesli | |
| 6,178,997 B1 | 1/2001 | Adams | |
| 6,479,793 B1 * | 11/2002 | Wittmann | B23K 9/0953 219/130.5 |
| 7,552,731 B2 | 6/2009 | Jorczak | |
| 7,605,341 B2 * | 10/2009 | Higgins | B23K 10/00 219/121.54 |
| 8,129,652 B2 | 3/2012 | Hampton | |
| 8,158,905 B2 * | 4/2012 | Khakhalev | B23K 9/10 219/137 R |
| 8,258,421 B2 | 9/2012 | Halvorsen et al. | |
| 8,651,137 B2 | 2/2014 | Keffer | |
| 8,754,348 B2 | 6/2014 | Salsich | |
| 9,517,523 B2 * | 12/2016 | Barhorst | B23K 9/164 |
| 9,690,304 B2 * | 6/2017 | Downie | G05D 11/135 |
| 9,821,402 B2 * | 11/2017 | Fisher | B23K 35/0261 |
| 10,672,967 B2 | 6/2020 | Denis | |
| 11,801,482 B2 * | 10/2023 | Hoeger | B23K 9/325 |
| 2003/0213520 A1 | 11/2003 | Prinz | |
| 2005/0039804 A1 | 2/2005 | Kim | |
| 2007/0051703 A1 | 3/2007 | Neff | |
| 2007/0289950 A1 | 12/2007 | Eyton | |
| 2008/0053965 A1 * | 3/2008 | Laymon | B23K 35/38 219/74 |
| 2009/0065489 A1 * | 3/2009 | Duffy | B23K 9/0956 219/136 |
| 2009/0107959 A1 | 4/2009 | Khakhalev et al. | |
| 2009/0107960 A1 * | 4/2009 | Hampton | B23K 9/0956 219/74 |
| 2009/0152251 A1 | 6/2009 | Dantinne | |
| 2010/0276398 A1 | 11/2010 | Halvorsen | |
| 2011/0049116 A1 | 3/2011 | Rappl et al. | |
| 2012/0255988 A1 | 10/2012 | Perry | |
| 2013/0015169 A1 | 1/2013 | Marschke et al. | |
| 2013/0112660 A1 | 5/2013 | Enyedy | |
| 2014/0097165 A1 | 4/2014 | Leisner | |
| 2014/0374396 A1 | 12/2014 | Luo et al. | |
| 2015/0027998 A1 | 1/2015 | Brine et al. | |
| 2016/0001391 A1 | 1/2016 | Nacey et al. | |
| 2016/0016250 A1 | 1/2016 | Denis | |
| 2016/0059341 A1 | 3/2016 | Peters | |
| 2016/0136764 A1 | 5/2016 | Enyedy | |
| 2016/0263691 A1 * | 9/2016 | Smith | G05D 11/132 |
| 2017/0165775 A1 | 6/2017 | Knoener | |
| 2017/0216954 A1 | 8/2017 | Blankman | |
| 2018/0031152 A1 | 2/2018 | Rajagopalan | |
| 2018/0043456 A1 | 2/2018 | Hoeger | |
| 2018/0290229 A1 * | 10/2018 | Wada | F17C 13/00 |
| 2019/0118279 A1 | 4/2019 | Welsh | |
| 2019/0302811 A1 | 10/2019 | Bragg | |
| 2021/0101221 A1 | 4/2021 | Cross et al. | |

FOREIGN PATENT DOCUMENTS

| | | | |
|---|---|---|---|
| CN | 101214584 | 7/2008 | |
| CN | 111098000 | 5/2020 | |
| EP | 0331062 | 9/1989 | |
| EP | 0854006 | 7/1998 | |
| JP | S63240930 | 10/1988 | |
| JP | 01186281 | 7/1989 | |
| JP | 2005177822 | 7/2005 | |
| JP | 2019051546 | 4/2019 | |
| RU | 66255 U1 * | 9/2007 | ............... B23K 9/16 |
| TW | 200920537 | 5/2009 | |
| WO | 2013051178 | 4/2013 | |
| WO | 2015047770 | 4/2015 | |
| WO | 2019170289 | 9/2019 | |
| WO | 2019170289 A1 | 9/2019 | |

OTHER PUBLICATIONS

"Welding Handbook, Chapter 4—Gas Metal Arc Welding ED", O'Brien, Jan. 1, 2004, Welding Handbook Processes, vol. 2, Welding Processes, Part 1, American Welding Society, p. 178, right hand column, paragraphs 1-2.
International Search Report and Written Opinion for PCT/US2017/046700, dated Nov. 22, 2017, 20 pages.
Bush, Steve; "Smart IoT valve allows remote gas cylinder management," Electronics Weekly.com., Jan. 18, 2018, 3 pages.
Siemens World Wide; "SITRANS P280" Siemens Industry Mall, https://maill.undustry.siemens.com/mall/en/WWW/Catalog/Products/10069488, retrieved Feb. 18, 2020, 1 page.
Pietro Fiorentini S.p.a.; "Smart Gas Grids—FIO2 Gas Pressure Regulator Smart add-on" 2015, retrieved on Feb. 26, 2020, 6 pages.
Pietro Fiorentini S.p.a.; "FIO 2.2 Smart add-on for gas pressure Regulators," 2015, retrieved on Feb. 26, 2020, 12 pages.
Environics, Series 3000 Gas Blending-Gas Delivery System, https://www.environics.com/products/gas-blending-gas-delivery-systems/, 5 pages, retreived Jan. 5, 2021.
SuperFlash, Fully customize and mix your gases!, https://oxyfuelsafety.com/fully-customize-and-mix-your-gases, Mar. 18, 2015, 7 pages.
Binzel-Abicor, EWR 2 / EWR 2 Net Gas Monitoring System, retreived from https://www.binzel-abicor.com/US/eng/products/robotic-systems/gas-management-system-ewr-2-ewr-2-net/, retreived on Jan. 19, 2021, 13 pages.
Brooks Instruments, Mass Flow Controllers & Meters: Mass flow control technology. Unsurpassed process precision, retrieved from https://www.brooksinstrument.com/en/products/mass-flow-controllers, retrieved on Jan. 19, 2021, 6 pages.
Miller Electric Manufacturing Company, Spectrum 1250MG, Jun. 2000, 48 pages.
European Patent Office, Extended European Search Report, Application No. 21159544.2, dated Aug. 16, 2021, 6 pages.
Extended European Search Report, appln No. 22151249.4, mailed Jun. 20, 2022, 9 pages.
Extended European Search Report for European Patent Application No. 22152645.2, mailed Jul. 29, 2022, 10 pages.
European Patent Office, Office Action, Application No. 21159544.2, mailed Mar. 28, 2023, 5 pages.
Europea Patent Office, Office Action, Application No. 22151249.4 dated Jun. 12, 2023, 8 pages.
Canada Patent Office, Office Action, Application No. 3,143,816, dated Nov. 22, 2023, 4 pages.
European Patent Office, Office Action, Application No. 22151249.4 dated Jan. 18, 2024, 5 pages.

* cited by examiner

SMART MANIFOLDS FOR WELDING-TYPE SYSTEMS

CROSS REFERENCE TO RELATED APPLICATIONS

This application is a continuation of, and claims priority to, co-pending U.S. patent application Ser. No. 16/815,761, entitled "Smart Manifolds for Welding-Type Systems," filed Mar. 11, 2020, the entire contents of which being hereby incorporated by reference.

TECHNICAL FIELD

This disclosure relates to smart manifolds and, more particularly, to smart manifolds for welding-type systems.

BACKGROUND

Some welding-type systems use compressed air and/or or shielding gas to protect (or shield) against impurities that can be caused by elements in the atmosphere. Different welding-type operations may use different types of air/gas, and/or call for different rates of air/gas flow. Conventional regulators that attach to outlets of compressed air and/or shielding gas bottles are used to control air/gas flow rates from the bottle to the welding-type operation.

SUMMARY

Smart manifolds for welding-type systems are disclosed, substantially as illustrated by and described in connection with at least one of the figures, as set forth more completely in the claims.

These and other advantages, aspects, and/or novel features of the present disclosure, as well as details of an illustrated example thereof, will be more fully understood from the following description and drawings.

DRAWINGS

Features, aspects, and/or advantages of the present disclosure will become better understood when the following detailed description is read with reference to the accompanying drawings in which like characters represent like parts throughout the drawings, wherein.

Figure 1:
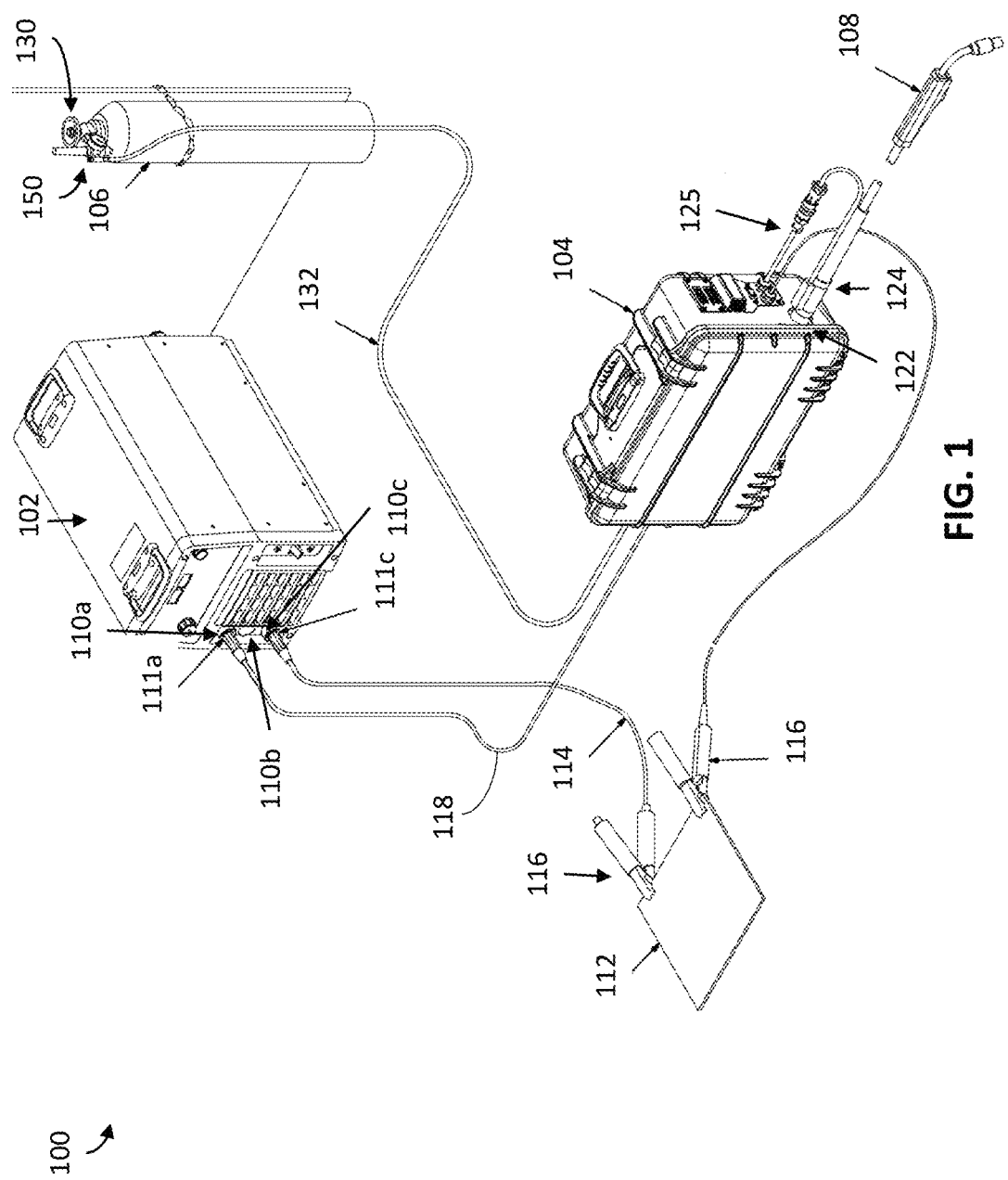
FIG. 1 shows an example of a welding-type system, in accordance with aspects of this disclosure.

The figures are not necessarily to scale. Where appropriate, similar or identical reference numbers are used to refer to similar or identical components. For example, reference numerals utilizing lettering (e.g., socket 110a, socket 110c) refer to instances of the same reference numeral that does not have the lettering (e.g., sockets 110)

DETAILED DESCRIPTION

Some operators of welding-type systems may have difficulty determining what type of air/gas, and/or how much air/gas, should be used in a given welding-type operation. Operators may also have trouble reading the gauges on conventional pressure regulators to determine the current air/gas flow, and/or adjusting conventional gauges to change the air/gas flow. Even if they are adept at this exercise, it may still be a nuisance and a loss of productive time to have to travel back and forth to/from the fluid tank to do it.

Additionally, it may be difficult for even the most experienced operators to determine how much air/gas is remaining in a bottle of compressed air and/or shielding gas. Further, performing welding-type operations without compressed air and/or shielding gas can have a substantial negative impact on the quality of the welding-type operation. Moreover, different welding-type operations may require different types of air/gas, and/or different tools (e.g., torches, guns, cutters, etc.) to use the air/gas. Further, each tool may have a different air/gas connector, which may require one or more different complementary connectors on welding-type equipment.

Disclosed systems and methods involve a smart regulator coupled to a fluid tank, where the smart regulator provides information regarding the current pressure(s) and/or flow rate to a remote device (e.g., a computer, mobile device, welding-type equipment, etc.) that can provide outputs more easily understood by an operator. The remote device may also use the information from the regulator to determine and/or output additional information, such as, for example, how much fluid (e.g., air and/or gas) is remaining and/or how much time is remaining before the fluid runs out or drops to less than a threshold amount (e.g., an amount that risks running out of fluid). In some examples, the welding-type equipment may shut down and/or become disabled if the remaining amount and/or time falls below a given threshold.

Disclosed systems and methods involve a smart manifold configured to work with several different fluid supplies. In this way, an operator may easily mix fluid types, switch between different fluid types, and/or switch between different fluid tanks. Additionally, the multiple fluid connections of the smart manifold may enable a single, universal, type of connector to be used with all welding-type equipment and/or tools, regardless of the type of fluid required.

Some examples of the present disclosure relate to a smart manifold, comprising a first inlet configured for fluid communication with a first fluid supply, a second inlet configured for fluid communication with a second fluid supply, an outlet configured for fluid communication with a welding power supply, a wire feeder, or a welding tool, a first valve configured to adjustably restrict fluid flow between the first inlet and the outlet based on a first control signal, and a second valve configured to adjustably restrict fluid flow between the second inlet and the outlet based on the first control signal or a second control signal.

In some examples, the smart manifold further comprises control circuitry configured to receive a device control signal from a remote device, determine the first control signal or second control signal based on the device control signal, and provide the first control signal or second control signal to the first valve and second valve. In some examples, the remote device comprises a welding-type power supply, a wire feeder, a welding-type tool, a mobile device, an accessory device, a pendant, or a computing system. In some examples, the remote device comprises a user interface configured to receive a welding parameter selection, and device circuitry configured to determine the device control signal based on the welding parameter selection. In some examples, the welding parameter selection comprises a fluid type, a fluid mixture, a fluid source, or a welding-type process. In some examples, the smart manifold further comprises a pressure sensor configured to measure an inlet pressure at the first inlet or second inlet, and an outlet pressure at the outlet, the control circuitry configured to transmit a measurement signal representative of the inlet pressure, outlet pressure, or a flow rate to the remote device. In some examples, the smart manifold further comprises a first pressure sensor configured to measure a first inlet pressure at the first inlet and a second pressure sensor configured to measure a second inlet pressure at the second inlet, the control circuitry configured to transmit a measurement signal representative of the first inlet pressure or second inlet pressure to the remote device.

Some examples of the present disclosure relate to a smart manifold, comprising a first inlet configured for fluid communication with a first fluid supply, a second inlet configured for fluid communication with a second fluid supply, an outlet configured for fluid communication with a welding power supply, a wire feeder, or a welding torch, a first valve configured to adjustably restrict fluid flow between the first inlet and the outlet, a second valve configured to adjustably restrict fluid flow between the second inlet and the outlet, and an actuator configured to adjust the first valve or second valve in response to an actuator control signal.

In some examples, the smart manifold further comprises control circuitry configured to receive a device control signal from a remote device, determine the actuator control signal based on the device control signal, and provide the actuator control signal to the actuator. In some examples, the remote device comprises a welding-type power supply, a mobile device, or a computing system. In some examples, the remote device comprises a user interface configured to receive a welding parameter selection, and device circuitry configured to determine the device control signal based on the welding parameter selection. In some examples, the welding parameter selection comprises a fluid type, a fluid mixture, or a welding-type process. In some examples, the smart manifold further comprises a pressure sensor configured to measure an inlet pressure at the first inlet or second inlet, and an outlet pressure at the outlet, the control circuitry configured to transmit a measurement signal representative of the inlet pressure, outlet pressure, or a flow rate to the remote device. In some examples, the smart manifold further comprises a first pressure sensor configured to measure a first inlet pressure at the first inlet and a second pressure sensor configured to measure a second inlet pressure at the second inlet, the control circuitry configured to transmit a measurement signal representative of the first inlet pressure or second inlet pressure to the remote device.

Some examples of the present disclosure relate to a welding-type system, comprising a smart manifold, comprising a first inlet configured for fluid communication with a first fluid supply, a second inlet configured for fluid communication with a second fluid supply, an outlet configured for fluid communication with a welding power supply, a wire feeder, or a welding-type tool, a first valve configured to adjustably restrict fluid flow between the first inlet and the outlet based on a first control signal, and a second valve configured to adjustably restrict fluid flow between the second inlet and the outlet based on the first control signal, a second control signal, or a third control signal, and a remote device in communication with the smart manifold, the remote device configured to send the first control signal, the second control signal, or a device control signal to the smart manifold.

In some examples, the remote device is configured to send the device control signal, and the smart manifold further comprises control circuitry configured to receive the device control signal from a remote device, determine the first control signal or second control signal based on the device control signal, and provide the first control signal or second control signal to the first valve and second valve. In some examples, the remote device comprises a welding-type power supply, a mobile device, or a computing system. In some examples, the remote device comprises a user interface configured to receive a welding parameter selection, and device circuitry configured to determine the device control signal based on the welding parameter selection. In some examples, the welding parameter selection comprises a fluid type, a fluid mixture, a fluid source, or a welding-type process. In some examples, the smart manifold further comprises a pressure sensor configured to measure an inlet pressure at the first inlet or second inlet, and an outlet pressure at the outlet, the control circuitry configured to transmit a measurement signal representative of the inlet pressure, outlet pressure, or a flow rate to the remote device FIG. 1 shows an example of a welding-type system 100, such as may be used to conduct welding-type operations (e.g., welding, cutting, brazing, etc.). In some examples, the example welding-type system 100 shown in FIG. 1 may be used to conduct gas metal arc welding (GMAW) processes. In some examples, the welding-type system 100 may also be used with other arc welding processes (e.g., flux-cored arc welding (FCAW), gas shielded flux-cored arc welding (FCAW-G), gas tungsten arc welding (GTAW), submerged arc welding (SAW), shielded metal arc welding (SMAW), or similar arc welding processes). In some examples, the welding-type system 100 may be used with metal fabrication systems, such as plasma cutting systems, induction heating systems, and so forth.

In the example of FIG. 1, the welding-type system 100 includes a welding-type power supply 102 (a.k.a., a welding-type power source), a welding wire feeder 104, a fluid tank 106, and a welding torch 108. In some examples, the welding-type power supply 102 generally supplies welding-type power for the various welding-type components and/or accessories of the welding-type system 100 (e.g., the welding wire feeder 104 and/or welding torch 108) through connections of one or more plugs 111 with one or more sockets 110 of the power supply 102. In the example of FIG. 1, the welding-type power supply 102 is coupled to the welding wire feeder 104 through one plug 111*a* and socket 110*a* connection, and coupled to a work clamp 116 through another plug 111c and socket 110c connection. The plug 111c is coupled to one or more lead cables 114 that lead to the workpiece 112 through the work clamp 116, while the plug 111a is connected to one or more weld cables 118 which lead to the wire feeder 104. In the example of FIG. 1, the fluid tank 106 is coupled to the welding torch 108 through the wire feeder 104 via a fluid conduit 120.

In the example of FIG. 1, the wire feeder 104 includes a socket 122 connected to a plug 124 of the welding torch 108. In some examples, welding-type power from the welding-type power supply 102 and fluid from the fluid tank 106 may be delivered to the welding torch 108 through the connection of the plug 124 and socket 122. In some examples, filler material (e.g., wire) from the wire feeder 104 may also be supplied to the welding torch 108 via connection of the plug 124 and the socket 122. In the example of FIG. 1, a trigger plug 125 of the welding torch 108 is also connected to the wire feeder 104. Via the trigger plug 125 connection, signals from activation/deactivation of a trigger of the welding torch 108 may be communicated.

In some examples, the welding-type power supply 102 may instead directly couple to the plug 124 and/or trigger plug 125 of the welding torch 108, such that power, filler material, fluid, and/or trigger signals may be directly transmitted through the socket 110 of the power supply 102. In operation, an operator may engage a trigger of the torch 108 to initiate an arc (and/or other welding-type operation) between the torch 108 and the workpiece 112. While a welding torch 108 is depicted in the example of FIG. 1, in some examples, the torch 108 may be some other welding-type tool.

In the example of FIG. 1, a conventional pressure regulator 150 is coupled to the fluid tank 106. In some examples, the fluid tank 106 may be a tank of compressed air, shielding gas, or some other type and/or source of fluid (e.g., bottle, cylinder, etc.). In the example of FIG. 1, the fluid tank 106 includes a hand wheel 130 configured to open and/or close a valve of the fluid tank 106 when turned.

In some examples, when the valve of the fluid tank 106 is opened, fluid will flow from an outlet of the fluid tank 106 to an inlet of the pressure regulator 150. As shown, the fluid tank 106 is in fluid communication with the wire feeder 104 via a hose 132 that is coupled to an outlet of the pressure regulator 150. In some examples, the wire feeder 104 may have a socket configured to receive the hose 132.

In some examples, the pressure regulator 150 may include a knob that allows an operator to adjust a flow rate of fluid from the fluid tank 106 to the wire feeder 104 by changing a relative pressure between the inlet of the pressure regulator 150 and an outlet of the pressure regulator 150. In some examples, one or more gauges on the pressure regulator 150 may indicate a pressure at the inlet and/or outlet of the pressure regulator 150. In some examples, the pressure regulator 150 may instead be in fluid communication with the welding-type power source 102 (e.g., via the hose 132 and a socket 110 of the power source 102) or directly with the welding torch 108.

Conventional pressure regulators can be difficult to read and/or operate. The pressure gauges on conventional regulators can be less than intuitive, and some calculation is typically needed to figure out how the relative pressures translate to flow rate. Additionally, an operator must be physically next to the conventional pressure regulator to change the flow rate, which can be an inconvenience if the operator is currently performing a welding-type operation at a location some distance away. Also, if the operator is performing a welding-type operation and the supply of fluid from the fluid tank 106 runs out, the welding-type operation may be negatively impacted.

To reduce and/or avoid disadvantages associated with conventional pressure regulators, a smart regulator 200 may be configured to work with a remote device 250 (e.g., a computer, mobile device, welding-type equipment, etc.) to provide information regarding the current pressure(s) and/or flow rate of the regulator 200 that can be easily understood by an operator. The remote device 250 may also use the information from the regulator 200 to determine and/or output additional information, such as, for example, how much fluid is remaining and/or how much time is remaining before the fluid runs out or becomes dangerously low.

Figure 2A:
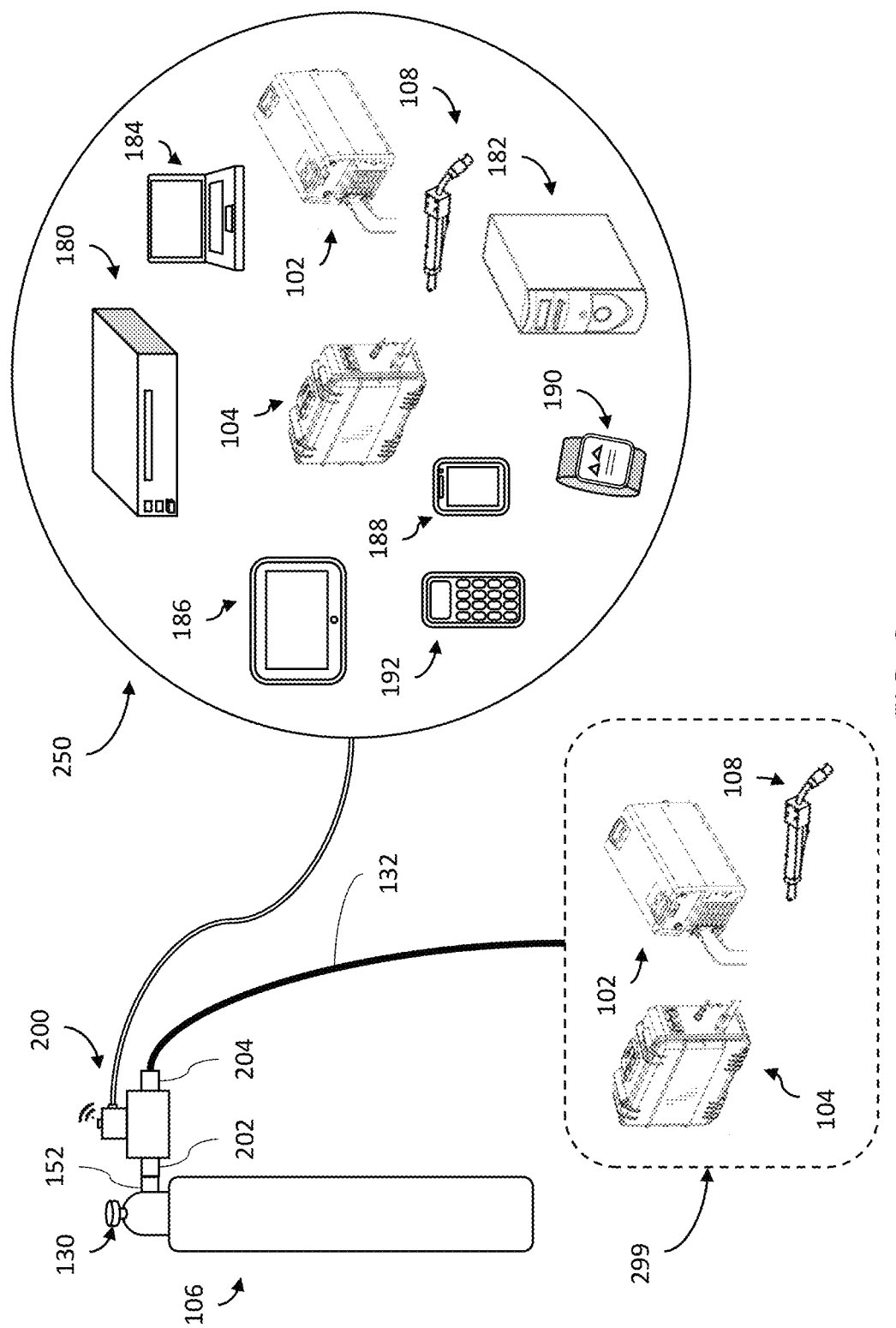
FIG. 2a shows an example of a smart regulator used with portions of the welding-type system of FIG. 1, in accordance with aspects of this disclosure.

FIG. 2a shows an example implementation of the smart regulator 200. As shown, the smart regulator 200 has a regulator inlet 202 coupled to the tank outlet 152 of the fluid tank 106. The smart regulator 200 also has a regulator outlet 204 coupled to a hose 132. The hose 132 fluidly connects the smart regulator 200 with a piece of welding-type equipment 299 (e.g., a wire feeder 104, welding-type power supply 102, and/or welding torch 108). The smart regulator 200 is also in electrical communication (e.g., wired and/or wireless) with a remote device 250. In some examples, the remote device 250 may comprise one or more of a computer server 180, desktop computer 182, laptop computer 184, tablet computer 186, smartphone 188, smart watch 190 (and/or other smart accessory), pendant 192, welding torch 108, wire feeder 104, and/or welding-type power supply 102).

Figure 2B:
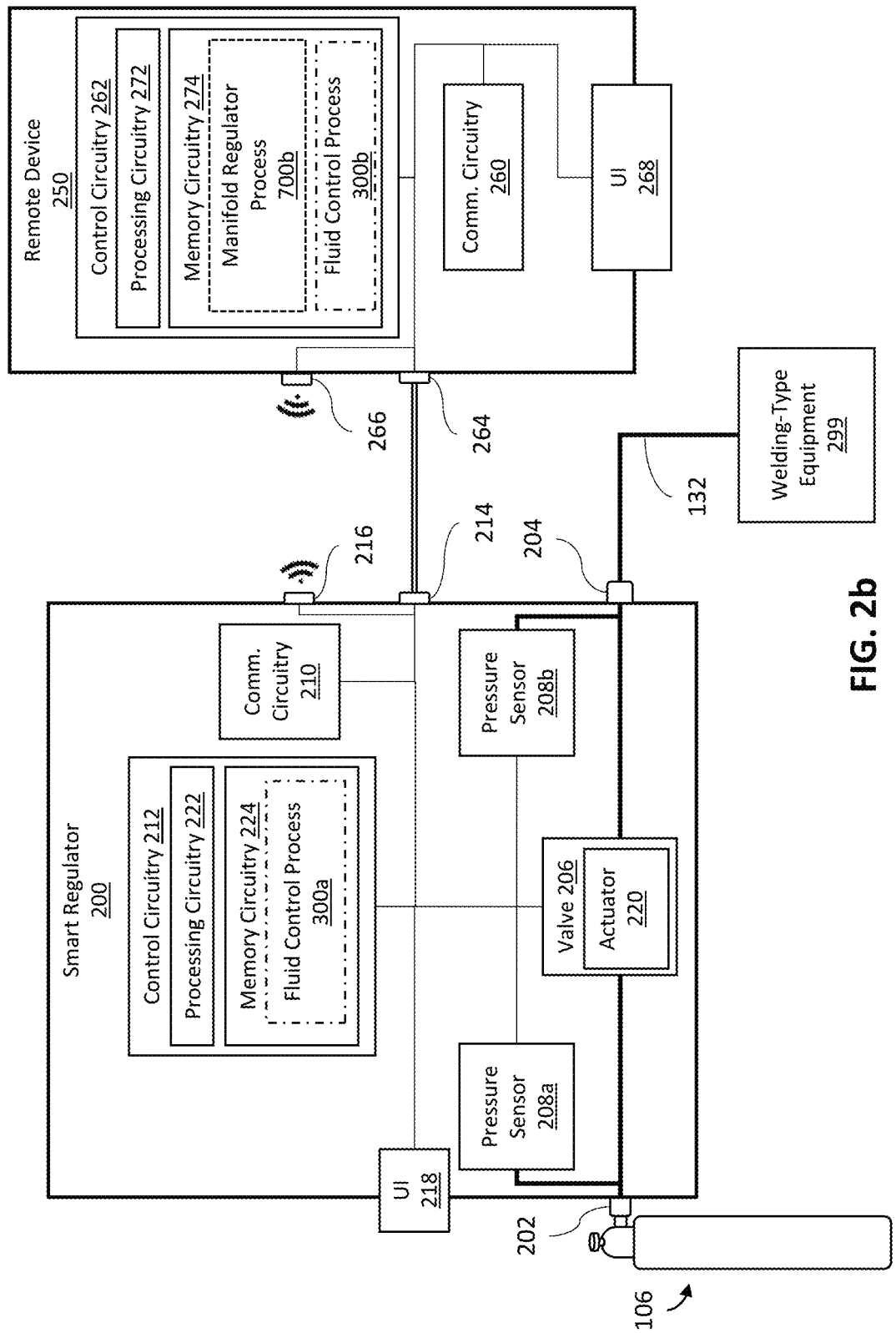
FIG. 2b is a block diagram showing components of the smart regulator of FIG. 2a, in accordance with aspects of this disclosure.

FIG. 2b is a block diagram showing example components of the smart regulator 200 and remote device 250. In the example of FIG. 2b, the smart regulator 200 includes a regulator inlet 202, a regulator outlet 204, a valve 206, two pressure sensors 208, regulator communication circuitry 210, regulator control circuitry 212, and a regulator user interface 218. As shown, the smart regulator 200 is in electrical communication with the remote device 250, via a wired connection through regulator port 214 and device port 264, and/or a wireless connection through regulator antenna 216 and device antenna 266. In some examples, the connection may be through a network (e.g., a Local Access Network, Wide Area Network, the Internet, etc.). In some examples, the regulator port 214 and/or device port 264 may be configured to receive universal serial bus (USB), serial, RJ45, CAT5, CAT6, CAT7, Ethernet, and/or other appropriate plugs, cables, and/or connectors.

In the example of FIG. 2b, the remote device 250 includes device control circuitry 262, device communication circuitry 260, and a device user interface 268. In some examples where the remote device 250 is a computer server, the device user interface 268 may be a different remote device 250. Though not shown in the example of FIG. 2b, in some examples, the smart regulator 200 and/or remote device 250 may also include one or more power sources (e.g., batteries, power circuitry, etc.). In some examples, power may additionally, or alternatively, be received from an outside power source (e.g., mains power) via the regulator port 214, device port 264, and/or some other means.

In the example of FIG. 2b, the regulator inlet 202 and regulator outlet 204 of the smart regulator 200 are in fluid communication with one another through a valve 206 of the smart regulator 200. In some examples, the valve 206 may be a proportional valve, a solenoid valve, a diaphragm valve, and/or some other appropriate valve. In some examples, the valve 206 may include a valve plug that may be moved into and out of a fluid flow path between the regulator inlet 202 and regulator outlet 204, thereby providing variable flow path obstruction and/or flow rate restriction. In some examples, the valve plug may be moved by a valve stem, armature, and/or other appropriate means.

In the example of FIG. 2b, the valve 206 includes an actuator 220 configured to open and/or close the valve 206. In some example, the actuator 220 may include a current to pressure converter, a solenoid (and/or solenoid coil), a motor (and/or motorized gears, movers, etc.), and/or some other appropriate electrically controllable actuating mechanism. In some examples, the valve 206 may be self-actuating, and/or the actuator 220 may be omitted.

In the example of FIG. 2b, the pressures sensors 208 of the smart regulator 200 are in fluid communication with the regulator inlet 202 and regulator outlet 204. In particular, an inlet pressure sensor 208a is in fluid communication with the regulator inlet 202, while an outlet pressure sensor 208b is in fluid communication with the regulator outlet 204. In some examples, the pressure sensors 208 may be configured to measure a fluid pressure at the regulator inlet 202 and/or regulator outlet 204. Though two pressure sensors 208 are shown in the example of FIG. 2b, in some examples a single pressure sensor 208 may be used.

In the example of FIG. 2b, the pressure sensors 208, valve 206, regulator communication circuitry 210, regulator control circuitry 212, regulator port 214, regulator antenna 216, and regulator UI 218 are in electrical communication with one another through a common electrical bus. In some examples, the UI 218 may comprise user accessible inputs and/or outputs. For example, the UI 218 may comprise one or more visual outputs (e.g., touch display screens, video monitors, light emitting diodes, incandescent lights, and/or other lights, etc.) and/or one or more audio outputs (e.g., audio speakers). In some examples, the UI 218 may further comprise one or more inputs (e.g., touch display screens, buttons, knobs, switches, microphones, etc.). In some examples, the UI 218 may comprise one or more input and/or output ports and/or devices (e.g., USB ports, audio ports, HDMI ports, etc.).

In some examples, the regulator communication circuitry 210 may be configured to facilitate communication (e.g., through the regulator port 214 and/or regulator antenna 216) via one or more wired protocols and/or wireless protocols. Wired protocols may include, for example, USB, Ethernet, serial, and/or other appropriate wired protocols. Wireless protocols may include, for example, cellular protocols, IEEE 802.11 standard protocols (commonly referred to as WiFi), short wavelength ultra-high frequency protocols (commonly referred to as Bluetooth), IEEE 802.15.4 standard protocols (commonly referred to as Zigbee), near field communication (NFC) protocols, radio frequency identification (RFID) protocols, and/or other appropriate wireless protocols. In some examples, the regulator control circuitry 212 may include one or more driving circuits (and/or processes) for the pressure sensors 208, valve 206, actuator 220, regulator communication circuitry 210, and/or UI 218.

In the example of FIG. 2b, the regulator control circuitry 212 includes regulator processing circuitry 222 and regulator memory circuitry 224. In some examples, the regulator processing circuitry 222 may include one or more processors. In some examples, the regulator memory circuitry 224 may store machine readable instructions configured for execution by the regulator processing circuitry 222 and/or one or more processors. As shown, the regulator memory circuitry 224 includes a fluid control process 300a, discussed further below.

In the example of FIG. 2b, the device communication circuitry 260, device control circuitry 262, UI 268, device port 264, and device antenna 266 of the remote device 250 are in electrical communication with one another through a common electrical bus. In some examples, the UI 268 may comprise user accessible inputs and/or outputs. For example, the UI 268 may comprise one or more visual outputs (e.g., touch display screens, video monitors, light emitting diodes, incandescent lights, and/or other lights, etc.) and/or one or more audio outputs (e.g., audio speakers). In some examples, the UI 268 may further comprise one or more inputs (e.g., touch display screens, buttons, knobs, switches, microphones, etc.). In some examples, the UI 268 may comprise one or more input and/or output ports and/or devices (e.g., universal serial bus (USB) ports, audio ports, HDMI ports, disc drives, compact disc (CD) drives, digital video disc (DVD) drives, etc.).

In some examples, the device communication circuitry 260 may be configured to facilitate communication (e.g., through the device port 264 and/or device antenna 266) via one or more wired protocols and/or wireless protocols. Wired protocols may include, for example, USB, Ethernet, serial, and/or other appropriate wired protocols. Wireless protocols may include, for example, cellular protocols, IEEE 802.11 standard protocols (commonly referred to as WiFi), short wavelength ultra-high frequency protocols (commonly referred to as Bluetooth), IEEE 802.15.4 standard protocols (commonly referred to as Zigbee), NFC protocols, RFID protocols, and/or other appropriate wireless protocols. In some examples, the device control circuitry 262 may include one or more driving circuits (and/or processes) for the device communication circuitry 260 and/or user interface 268.

In the example of FIG. 2b, the device control circuitry 262 includes device processing circuitry 272 and device memory circuitry 274. In some examples, the device processing circuitry 272 may include one or more processors. In some examples, the device memory circuitry 274 may store machine readable instructions configured for execution by the device processing circuitry 272 and/or one or more processors. As shown, the device memory circuitry 274 includes a manifold regulator process 700b, discussed further below. In the example of FIG. 2b, the device memory circuitry 274 also includes a fluid control process 300b, discussed further below.

Figure 3:
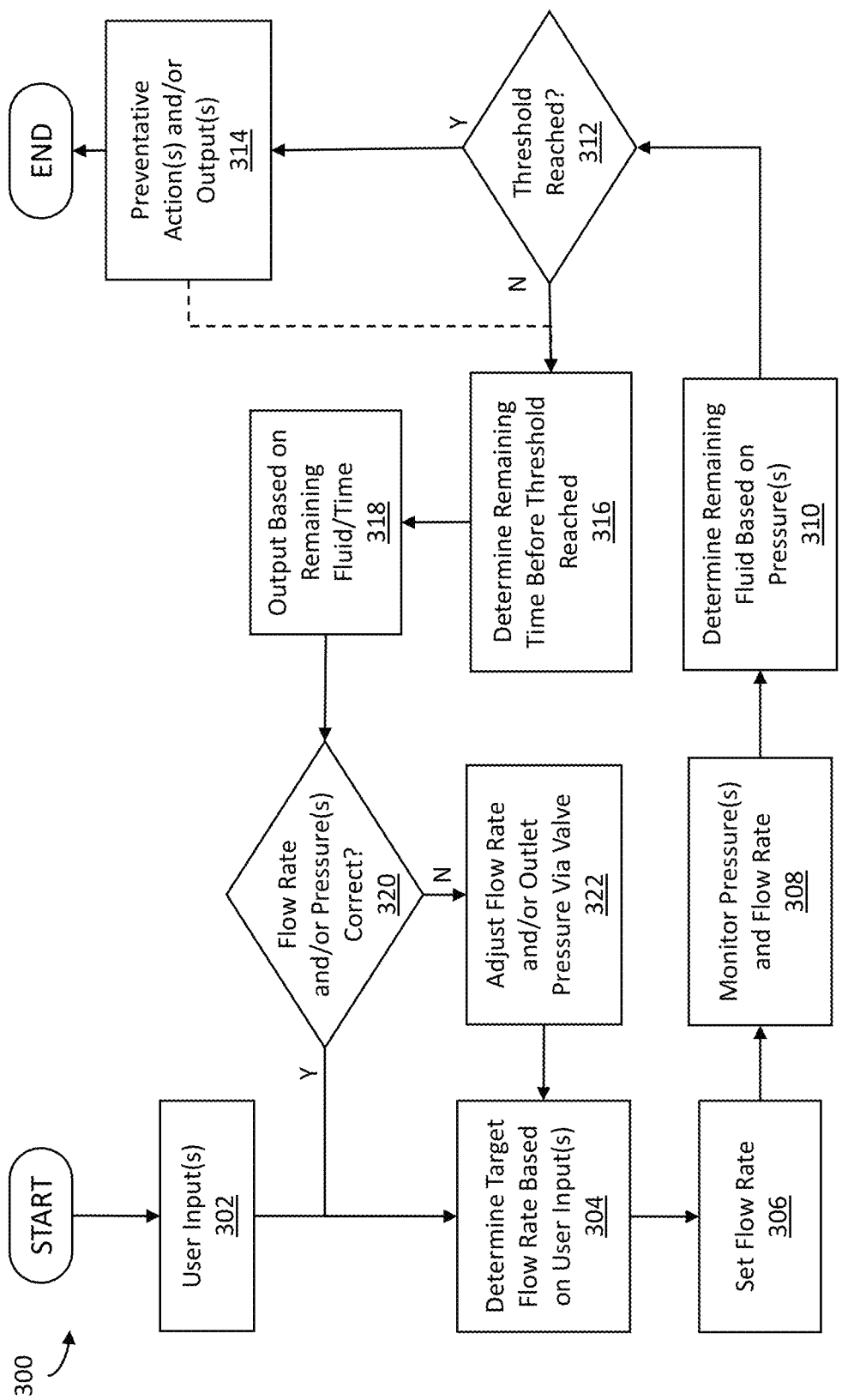
FIG. 3 is a flow diagram illustrating an example fluid control process, in accordance with aspects of this disclosure.

FIG. 3 is a flow diagram illustrating an example operation of the fluid control process 300. While, in the example of FIG. 2b, the fluid control process 300 is illustrated as being stored in the regulator memory circuitry 224 and/or device memory circuitry 274, in some examples, the fluid control process 300 may alternatively, or additionally, be implemented via discrete circuitry of the regulator control circuitry 212 and/or device control circuitry 262. In some examples, the fluid control process 300 may be implemented via machine readable instructions stored in the regulator memory circuitry 224 and/or device memory circuitry 274. While illustrated as a single process in the example of FIG. 3 for the sake of clarity and simplicity, in some examples, portions of the fluid control process 300 may be separately performed and/or executed by the smart regulator 200 and/or the remote device 250 (e.g., via the fluid control process 300a and/or fluid control process 300b, respectively). In some examples, the fluid control process 300 may be executed as part of, or in parallel with, a larger welding-type process.

In the example of FIG. 3, the fluid control process 300 begins at block 302. At block 302, the user provides one or more inputs. In some examples, the input(s) may be provided via the UI 268 of the remote device 250. In some examples, the input(s) may be provided via the UI 218 of the smart regulator 200. In some examples, the user input(s) may include, for example, a welding-type process (e.g., GMAW, GTAW, FCAW, SMAW, plasma, etc.), welding-type operation (welding, cutting, brazing, etc.), positioning of workpiece 112 (e.g., flat, horizontal, vertical, overhead), tool type (e.g., TIG torch, MIG gun, electrode holder, cutting tool, etc.), fluid type (e.g., compressed air, argon, helium, oxygen, carbon dioxide, etc.), fluid tank size (e.g., height, diameter, weight, volume, pressure when full, etc.), fluid tank brand, fluid tank identifier (e.g., serial number), full fluid tank pressure, threshold information, target flow rate, target pressure of regulator outlet 204, target use time, and/or other relevant information.

In the example of FIG. 3, the fluid control process 300 proceeds to block 304 after block 302. At block 304, the fluid control process 300 determines a target flow rate through the smart regulator 200 based on the user input(s) received at block 302. For example, the user may directly input a target flow rate, and the fluid control process 300 may determine that this is an appropriate target flow rate (e.g., within some known, stored, and/or previously determined range). As another example, the fluid control process 300 may determine a recommended target flow rate based on other user entered information (e.g., welding-type process, welding-type operation, positioning, tool type, target time, fluid type, fluid tank size, etc.). In some examples, the fluid control process 300 may prompt for (and/or receive) user approval (e.g., via UI 218 and/or UI 268) prior to proceeding with a recommended target flow rate.

In some examples, the fluid control process 300 may additionally, or alternatively, determine a target pressure of the regulator outlet 204 to achieve the target flow rate. In some examples, one or more signals indicative of the target flow rate (and/or target pressure) may be communicated to and/or from the smart regulator 200 and/or remote device 250. In some examples, the UI 268 of the remote device 250 and/or the UI 218 of the smart regulator 200 may provide one or more outputs indicative of the target flow rate (and/or target pressure).

In the example of FIG. 3, the fluid control process 300 proceeds to block 306 after block 304. At block 306, the fluid control process 300 sets a flow rate of the smart regulator 200 according to the target flow rate determined at block 304. In some examples, the setting of the flow rate may comprise setting the valve 206 (e.g., via the actuator 220) to achieve the target flow rate (and/or outlet pressure). In some examples, setting the valve 206 may comprise sending one or more electrical signals to the valve 206 and/or actuator 220.

In the example of FIG. 3, the fluid control process 300 proceeds to block 308 after block 306. At block 308, the fluid control process 300 monitors and/or measures a pressure at the regulator inlet 202 and/or regulator outlet 204 via the pressure sensors 208. In some examples, a measurement signal representative of the measured pressure(s) may be transmitted from the smart regulator 200 to the remote device 250 via one or more communication channels. In some examples, the UI 218 of the smart regulator 200 and/or remote device 250 may provide one or more outputs representative of the measured pressure(s). In some examples, the measured pressure(s) may be stored in regulator memory circuitry 224 and/or device memory circuitry 274, along with a timestamp.

In the example of FIG. 3, the fluid control process 300 also monitors, measures, and/or determines an existing flow rate at block 308. In some examples, the existing flow rate may be determined based on the pressure(s). In some examples, this determination may be done by the remote device 250. In some examples, this determination may be done by the smart regulator 200. In some examples, one or more signals indicative of the existing flow rate may be communicated to and/or from the smart regulator 200 and/or remote device 250. In some examples, the UI 268 of the remote device 250 and/or the UI 218 of the smart regulator 200 may provide one or more outputs indicative of the existing flow rate. In some examples, the existing flow rate may be stored in regulator memory circuitry 224 and/or device memory circuitry 274, along with a timestamp.

In the example of FIG. 3, the fluid control process 300 proceeds to block 310 after block 308. At block 310, the fluid control process 300 determines (and/or estimates) a remaining amount of fluid in the fluid tank 106. In some examples, the remaining amount of fluid may be stored in memory circuitry with a timestamp. In some examples, the fluid control process 300 may determine the remaining amount of fluid in the fluid tank 106 based on the pressure(s) measured at block 308. For example, the fluid control process 300 may determine how much fluid is remaining by measuring the pressure at the regulator inlet 202.

In some examples, the fluid control process 300 may additionally determine what percentage of the fluid is remaining based on a pressure of the fluid tank 106 when full. In some examples, information about the fluid tank 106 when full may be directly input by the user at block 302, In some examples, information about the fluid tank 106 when full may be determined using information input by the user at block 302. For example, the user may input a fluid type, tank size, tank identifier, and/or tank brand, and the fluid control process 300 may determine the pressure of the fluid tank 106 when full based on the this information (e.g., via a data base, lookup table, etc.). In some examples, the fluid control process 300 may default to some preset information about the fluid tank 106 if unable to determine from user input.

In some examples, the fluid control process 300 may determine the remaining amount of fluid in the fluid tank 106 based on an amount of fluid used and an amount of fluid in the fluid tank 106 when full. For example, the remaining amount of fluid may be equal to the amount of fluid in the tank 106 when full (or when the current operation began) minus the amount of fluid used. In some examples, the fluid control process 300 may use stored past flow rate(s), measured pressure(s), and/or timestamp information to estimate how much fluid has been used and/or flowed through the smart regulator 200 since the beginning of the fluid control process 300 (and/or over some given amount of time).

In the example of FIG. 3, the fluid control process 300 proceeds to block 312 after block 310. At block 312, the fluid control process 300 determines whether the remaining amount of fluid in the fluid tank 106 determined at block 314 is below a threshold level. In some examples, the threshold level may be stored in regulator memory circuitry 224 and/or device memory circuitry 274. In some examples, the threshold level may be input by the user at block 302. In some examples, the threshold level may be set at a default level (e.g., 10% left) if no threshold is input by the user.

In the example of FIG. 3, the fluid control process 300 proceeds to block 314 after block 312 if the fluid control process 300 determines that the threshold level has been reached at block 312. At block 314, the fluid control process 300 takes one or more preventative actions and/or generates one or more outputs to prevent the below threshold fluid level from negatively impacting a welding-type operation.

For example, the fluid control process 300 may shut down and/or disable welding-type equipment 299 to prevent the below threshold fluid level from negatively impacting a welding-type operation. As another example, the fluid control process 300 may output a prominent and/or emphasized alert, notification, and/or warning on a UI of the welding-type equipment 299, the UI 218 of the smart regulator 200, and/or the UI 268 of the remote device 250. In some examples, the alert, notification, and/or warning may be output via a communication (e.g., via email, text message, and/or or app) to an operator, owner, purchasing manager, and/or welding supply distributor. As another example, the fluid control process 300 may open a website or service where more fluid can be ordered, output a link to a website or service where more fluid can be ordered, or automatically reorder more fluid.

In the example of FIG. 3, the fluid control process 300 ends after block 314. However, as shown, in some examples, the fluid control process 300 may proceed to block 316 after 314, instead of ending. As shown, the fluid control process 300 also proceeds to block 316 after block 312 if the remaining amount of fluid determined at block 310 is above the threshold level.

At block 316, the fluid control process 300 determines a remaining time until the fluid tank 106 reaches the threshold level. In some examples, the remaining time may be a positive or negative value (e.g., to account for situations where the threshold has been surpassed). In examples where block 316 executes after block 314, and the threshold amount of remaining fluid used at block 312 is greater than zero, the fluid control process 300 may use zero as the threshold.

In some examples, the determination of remaining time may be based on the remaining fluid amount determined at block 310 and an estimated fluid use rate. In some examples, the estimated fluid use rate may be determined using an existing fluid flow rate and/or an average fluid flow rate. In some examples, the average fluid flow rate may be estimated using past timestamped fluid flow rates, outlet pressures, and/or remaining fluid levels stored at block 308 and/or 310. In some examples, the average fluid flow rate may be determined based on average fluid flow rates for similar welding-type processes, welding-type operations, tool types, fluid types, tank brands, workpiece positioning, etc. For example, the device memory circuitry 274 may have a database, lookup table, and/or other data correlations in device memory circuitry 274 that allow for this information to be accessed.

In the example of FIG. 3, the fluid control process 300 proceeds to block 318 after block 316. At block 318, the fluid control process 300 provides an output based on the remaining fluid and/or times determined at blocks 310 and 316. In some examples, the remaining fluid may be output in the form of a graphic, video, audio, text, numeric, and/or percentage (e.g., of total possible and/or beginning fluid). In some examples, the output may be a communication (e.g., via email, text message, and/or app) to an operator, owner, purchasing manager, and/or welding supply distributor.

In the example of FIG. 3, the fluid control process 300 proceeds to block 320 after block 318. At block 320, the fluid control process 300 compares the existing flow rate (and/or a measured outlet pressure) with the target flow rate (and/or target outlet pressure) and determines whether the existing flow rate and/or outlet pressure matches the target flow rate and/or target outlet pressure (and/or within some input and/or stored threshold range). In some examples, the determination may occur at the smart regulator 200. In some examples, this determination is performed at the remote device 250, and the remote device 250 sends one or more signals indicative of the determination result to the smart regulator 200.

In the example of FIG. 3, the fluid control process 300 proceeds to block 322 after block 320 if the fluid control process 300 determines that the existing flow rate and/or outlet pressure does not match the target flow rate and/or target outlet pressure (and/or is outside of a threshold range). At block 322, the fluid control process 300 determines and/or makes one or more adjustments to the valve 206 (e.g., via the actuator 220) to achieve the target flow rate (and/or outlet pressure), given the existing flow rate (and/or outlet pressure). In some examples, making one or more adjustments to the valve 206 to correct the fluid flow may comprise sending one or more electrical signals to the valve 206 and/or actuator 220.

In the example of FIG. 3, the fluid control process 300 returns to block 304 after block 322. As shown, the fluid control process 300 also returns to block 304 after 320 if the fluid control process 300 determines that the existing flow rate and/or outlet pressure does match the target flow rate and/or target outlet pressure (and/or is within a threshold range).

While the smart regulator 200 can help an operator more easily control and monitor fluid flow from a single fluid tank 106, in some examples, an operator may wish to control and/or monitor fluid flow from several different fluid tanks 106. For example, an operator may wish to switch to a different fluid tank 106 when the fluid supply in one fluid tank 106 is running low. Or an operator may wish to switch to a different fluid type in order to support a different welding-type operation and/or different welding-type process. Or an operator may wish to use several different fluid tanks 106 at once, so as to make a custom mixture of fluids for a particular task. In such examples, it would be helpful to have a way to change which fluid tank 106 is providing fluid to a piece of welding-type equipment 299 without having to travel to the fluid tank 106 and manually change the connection.

The present disclosure further contemplates a smart manifold configured to work with several different fluid supplies (e.g., fluid tanks 106 and/or smart regulators 200). In this way, an operator may easily mix fluid types, switch between different fluid types, and/or switch between different fluid sources. Additionally, the smart manifold may enable a single type of connector to be used with welding-type equipment 299.

Figure 4A:
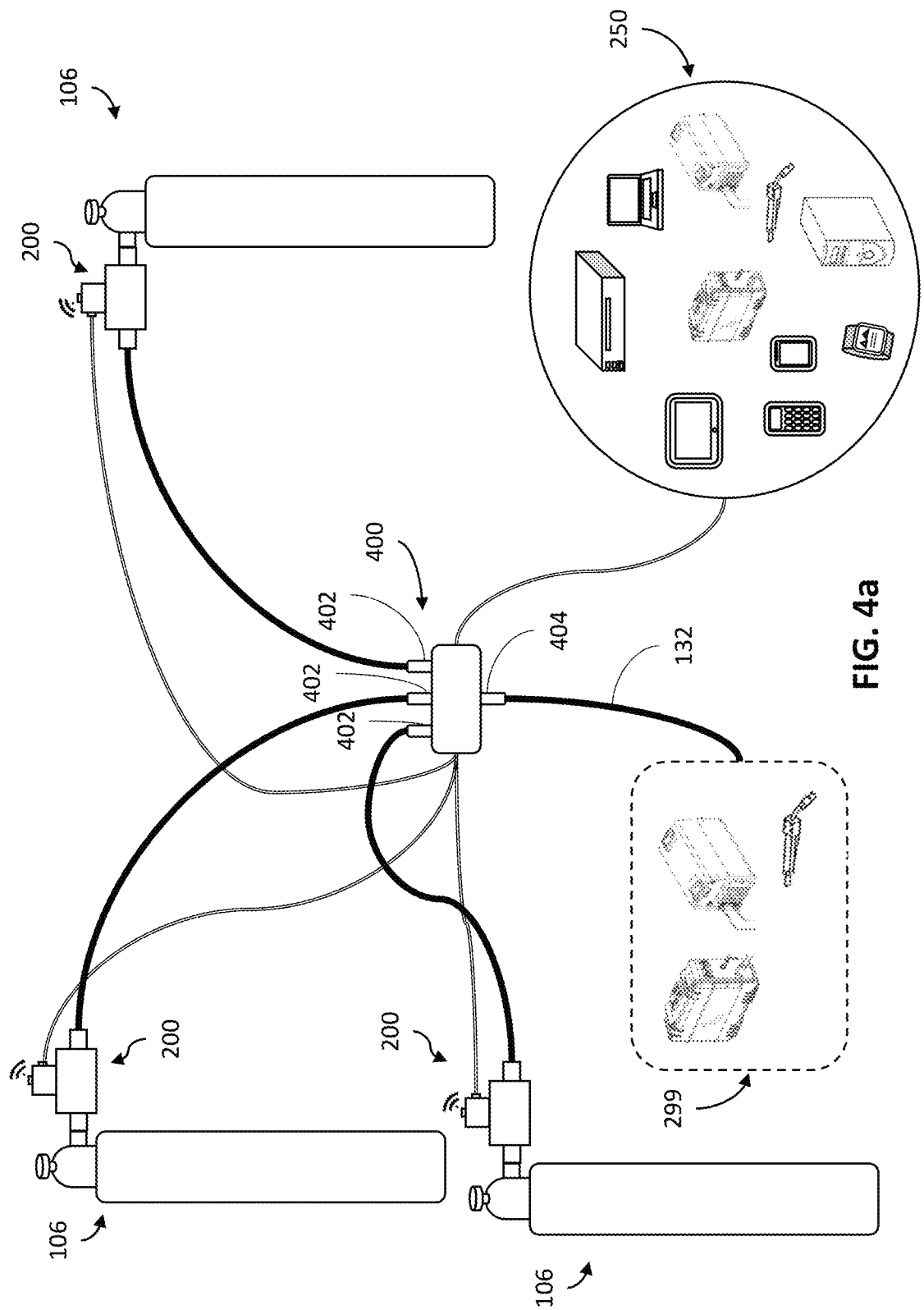
FIG. 4a shows several smart regulators used with an example smart manifold, in accordance with aspects of this disclosure.

FIG. 4a shows an example of a smart manifold 400. As shown, the smart manifold has three manifold inlets 402 and one manifold outlet 404. In some examples, the smart manifold 400 may have more than three manifold inlets 402. As shown, each of the manifold inlets 402 of the smart manifold 400 are in fluid communication with a different fluid tank 106, through a smart regulator 200. The smart regulator 200 is coupled to both the fluid tank 106 and a hose 132 leading from the smart regulator 200 to the manifold inlet 402. The manifold outlet 404 is in fluid communication with a piece of welding-type equipment 299 through a hose 132 extending from the manifold outlet 404 to the welding-type equipment 299.

In the example of FIG. 4a, the smart manifold 400 is in electrical communication with each of the smart regulators 200. As shown, the smart manifold 400 is also in electrical communication with a remote device 250. While wired electrical connections are illustrated in the example of FIG. 4a, in some examples, the electrical communication may be via a wireless medium.

Figure 4B:
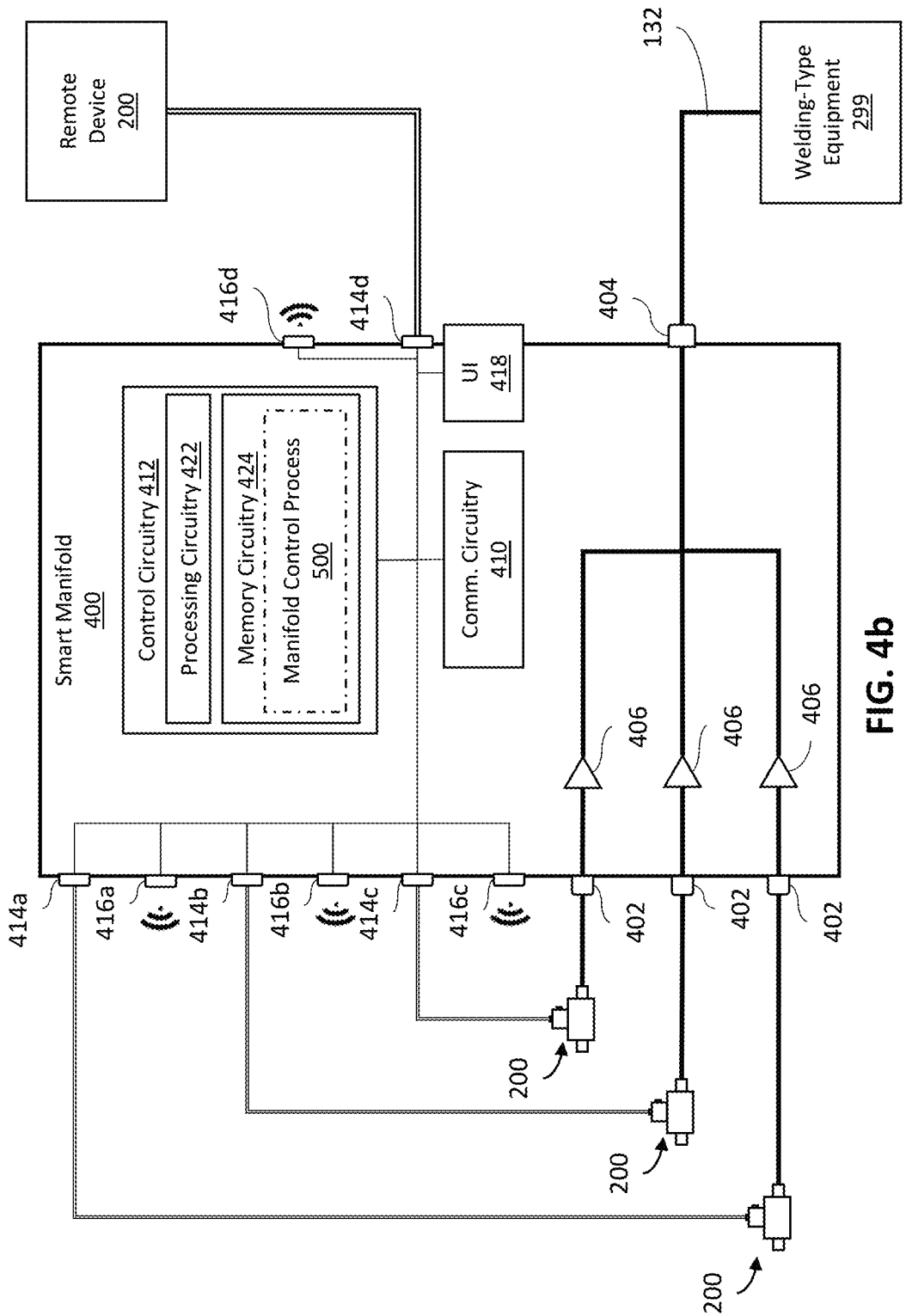
FIG. 4b is a block diagram showing components of the smart manifold of FIG. 4a, in accordance with aspects of this disclosure.

FIG. 4b is a block diagram showing example components of the smart manifold 400. In the example of FIG. 4b, the smart manifold 400 includes three manifold inlets 402 in fluid communication with a manifold outlet 404 through three one-way check valves 406. In some examples, the one-way check valves 406 may ensure there is no back flow of fluid. In some examples, the fluid communication lines between the check valves 406 and the manifold outlet 404 may serve as a mixing chamber when fluids are received from multiple manifold inlets 402. In some examples, an additional check valve may be placed between the manifold outlet 404 and all the other check valves 406, and the fluid communication lines between the additional check valve and the other check valves 406 may serve as the mixing chamber.

In the example of FIG. 4b, the smart manifold 400 further includes four manifold ports 414, four manifold antennas 416, manifold communication circuitry 410, manifold control circuitry 412, and a manifold UI 418, all in electrical communication with one another through a common electrical bus. As shown, the smart manifold 400 is in electrical communication with the remote device 250, via a wired connection through manifold port 414d, and/or a wireless connection through manifold antenna 416d. The smart manifold 400 is in electrical communication with three smart regulators 200 via a wired connection through the manifold port 414a, manifold port 414b, and manifold port 414c, and/or a wireless connection through manifold antenna 416a, manifold antenna 416b, and/or manifold antenna 416c.

While only one manifold port 414d is shown facilitating the wired connection between the smart manifold 400 and the remote device 250 in the example of FIG. 4b, in some examples, several manifold ports 414 may be used (e.g., similar to the manifold regulator 600 discussed below). In some examples, each manifold port 414 may be configured similar to the regulator port 214 discussed above. In some examples, each manifold antenna 416 may be similar to the regulator antenna 216 discussed above. While several manifold antennas 416 are shown in the example of FIG. 4b, in some examples, fewer manifold antennas 416 (e.g., one manifold antenna 416) may be used.

In some examples, the manifold communication circuitry 410 may be configured to facilitate communication (e.g., through the manifold ports 414 and/or manifold antennas 416) via one or more wired protocols and/or wireless protocols. Wired protocols may include, for example, USB, Ethernet, serial, and/or other appropriate wired protocols. Wireless protocols may include, for example, cellular protocols, IEEE 802.11 standard protocols (commonly referred to as WiFi), short wavelength ultra-high frequency protocols (commonly referred to as Bluetooth), IEEE 802.15.4 standard protocols (commonly referred to as Zigbee), NFC protocols, RFID protocols, and/or other appropriate wireless protocols. In some examples, the manifold control circuitry 412 may include one or more driving circuits (and/or processes) for the manifold communication circuitry 410.

In the example of FIG. 4b, the manifold control circuitry 412 includes manifold processing circuitry 422 and manifold memory circuitry 424. In some examples, the manifold processing circuitry 422 may include one or more processors. In some examples, the manifold memory circuitry 424 may store machine readable instructions configured for execution by the manifold processing circuitry 422 and/or one or more processors. As shown, the manifold memory circuitry 424 includes a manifold control process 500, discussed further below.

Figure 5:
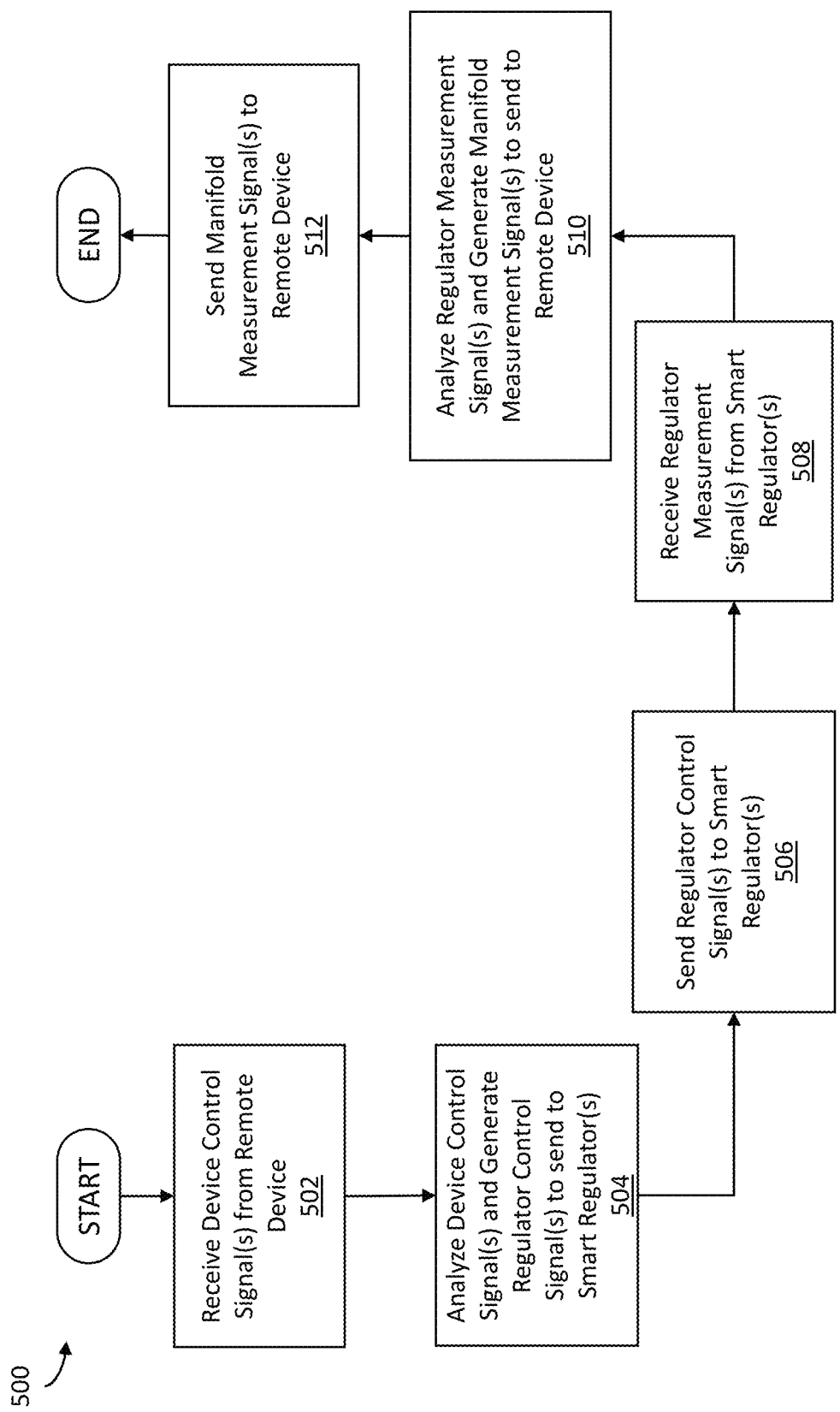
FIG. 5 is a flow diagram illustrating an example manifold control process, in accordance with aspects of this disclosure.

FIG. 5 is a flow diagram illustrating an example operation of the manifold control process 500. While the manifold control process 500 is illustrated as being stored in the manifold memory circuitry 424 in FIG. 4b, in some examples, the manifold control process 500 may alternatively, or additionally, be implemented via discrete circuitry of the manifold control circuitry 412. In some examples, the manifold control process 500 may be implemented via machine readable instructions stored in the manifold memory circuitry 424.

In some examples, the manifold control process 500 may be executed as part of, or in parallel with, the fluid control process 300. In some examples, the manifold control process 500 may facilitate communication of information and/or control signals between the remote device 250 and the various smart regulators 200 while the remote device 250 and the various smart regulators 200 are executing the fluid control process 300. In some examples, the manifold control process 500 may facilitate communication between the smart regulators 200 and a remote device 250 executing one, two, or three (or more) instances of the fluid control process 300 (e.g., one instance for each smart regulator 200).

In the example of FIG. 5, the manifold control process 500 begins at block 502. At block 502, the manifold control process 500 receives one or more device control signals from the remote device 250 (e.g., via the manifold port 414d and/or manifold antenna 416d). In some examples, the device control signals may, for example, relate to a target flow rate for all or some of the smart regulators 200, a target outlet pressure for all or some of the smart regulators 200, and/or a specific adjustment to make to the valve 206 for all or some of the smart regulators 200.

In the example of FIG. 5, the manifold control process 500 proceeds to block 504 after block 502. At block 504, the manifold control process 500 analyzes the device control signal(s) received at block 502. In some examples, the analysis may comprise parsing the control signal(s) to determine which smart regulator(s) 200 the control signal(s) pertain. In some examples, the control signal(s) sent from the remote device 250 may include one or more identifiers corresponding to the pertinent smart regulator(s) 200 and/or fluid tank(s) 106 to assist the manifold control process 500 in its analysis.

At block 504, the manifold control process 500 also generates one or more manifold control signals to send to one or more of the smart regulators 200. In some examples, the manifold control signal(s) may be based on the device control signal(s) received at block 502. For example, manifold control signals may include the same command(s), targets, and/or other data as corresponding device control signals. In some examples, the manifold control signals may include addressing information to ensure they are sent to the correct smart regulator 200 (e.g., via the correct manifold port 414, manifold antenna 416, and/or communication protocol), and/or be formatted to ensure the appropriate smart regulator 200 can understand the information.

In the example of FIG. 5, the manifold control process 500 proceeds to block 506 after block 504. At block 506, the manifold control process 500 sends the manifold control signal(s) generated at block 504 to the appropriate smart regulator(s) 200 (e.g., via the appropriate manifold port 414, manifold antenna 416, and/or communication protocol).

In the example of FIG. 5, the manifold control process 500 proceeds to block 508 after block 506. At block 508, the manifold control process 500 receives one or more regulator measurement signals from the smart regulator(s) 200 (e.g., via the manifold ports 414a-c and/or manifold antennas 416a-c). In some examples, the regulator measurement signals may, for example, relate to a measured inlet pressure, outlet pressure, and/or flow rate of for all or some of the smart regulators 200.

In the example of FIG. 5, the manifold control process 500 proceeds to block 510 after block 508. At block 510, the manifold control process 500 analyzes the regulator measurement signal(s) received at block 508. In some examples, the analysis may comprise parsing the measurement signal(s) to determine from which smart regulator(s) 200 the regulator measurement signal(s) were sent. In some examples, the regulator measurement signal(s) sent from the smart regulator(s) 200 may include one or more identifiers corresponding to the pertinent smart regulator(s) 200 and/or fluid tank(s) 106. In some examples, the smart manifold 400 may use this information to help determine from which smart regulator(s) 200 the regulator measurement signal(s) were received. In some examples, the smart manifold 400 may additionally, or alternatively, determine through which manifold port 414 and/or manifold antenna 416 the regulator measurement signal(s) were received to determine from which smart regulator(s) 200 the signals were received.

At block 510, the manifold control process 500 also generates one or more manifold measurement signals to send to the remote device 250. In some examples, the manifold measurement signal(s) may be based on the regulator measurement signal(s) received at block 508. For example, manifold measurement signals may include the measurement data as corresponding regulator measurement signals. In some examples, the manifold measurement signals may include addressing and/or identification information to indicate to the remote device 250 to which smart regulator 200 and/or fluid tank 106 they pertain.

In the example of FIG. 5, the manifold control process 500 proceeds to block 512 after block 510. At block 512, the manifold control process 500 sends the manifold measurement signal(s) generated at block 510 to the remote device 250. As shown, the manifold control process 500 ends after block 512. However, in some examples, the manifold control process 500 may instead return to block 502 rather than ending.

While the smart manifold 400 discussed with respect to FIGS. 4a-5 may help an operator easily mix fluid types, switch between different fluid types, and/or switch between different fluid sources, it requires several smart regulators 200 to properly operate. However, in some examples, the necessary number of smart regulators 200 may be unavailable. Thus, this disclosure further contemplates an alternative smart manifold regulator 600 that integrates a smart regulator 200 into a smart manifold 400, and requires no additional smart regulators 200 to function.

Figure 6A:
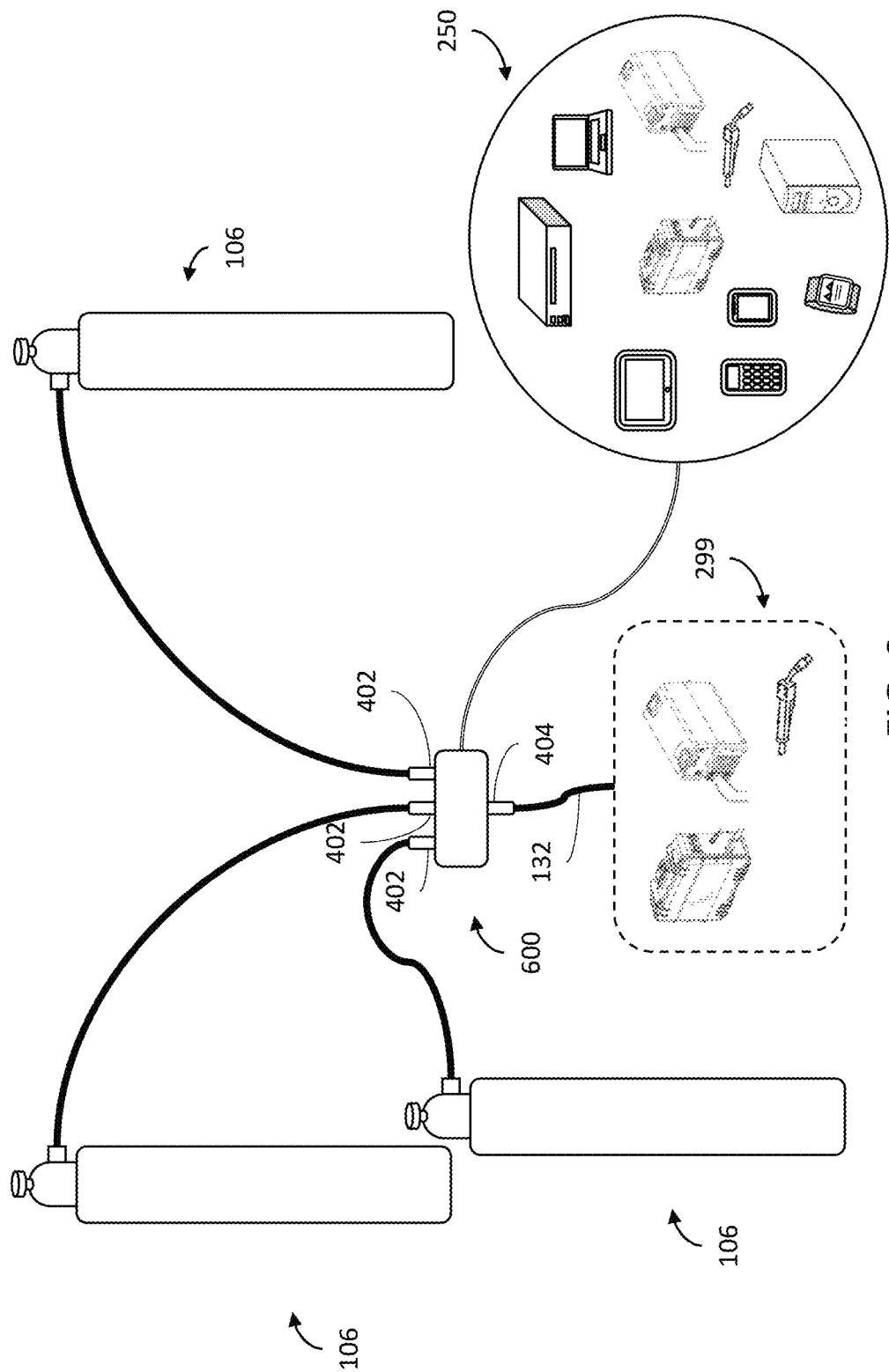
FIG. 6a shows several fluid tanks used with an example of an alternative smart manifold, in accordance with aspects of this disclosure.

FIG. 6a shows an example of a smart manifold regulator 600. Like the smart manifold 400, the manifold regulator 600 has three manifold inlets 402 and one manifold outlet 404. In some examples, the manifold regulator 600 may have more than three manifold inlets 402. As shown, each of the manifold inlets 402 of the manifold regulator 600 are in fluid communication with a different fluid tank 106 via a hose. Unlike the smart manifold 400, the manifold regulator 600 is in direct fluid communication with the fluid tanks 106, rather than going through a smart regulator 200. Like the smart manifold 400, the manifold outlet 404 of the manifold regulator 600 is in fluid communication with a piece of welding-type equipment 299 through a hose 132 extending from the manifold outlet 404 to the welding-type equipment 299.

In the example of FIG. 6a, the manifold regulator 600 is in electrical communication with a remote device 250. While a wired electrical connection is illustrated in the example of FIG. 6a, in some examples, the electrical communication may be via a wireless medium. While a single wired electrical connection is illustrated in the example of FIG. 6a, in some examples, there may be multiple wired electrical connections (e.g., connecting to multiple device ports 264 of the remote device 250).

Figure 6B:
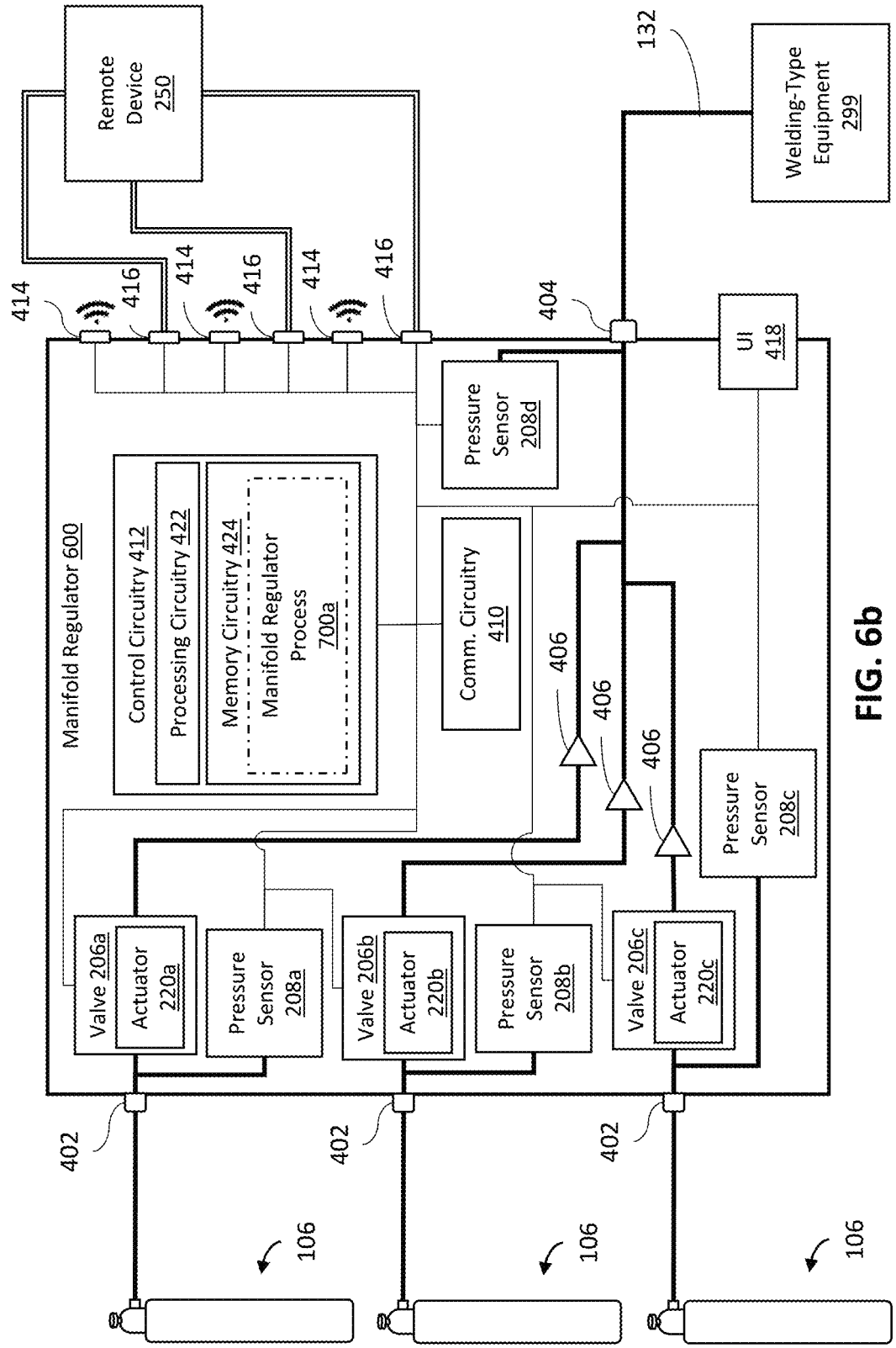
FIG. 6b is a block diagram showing components of the alternative smart manifold of FIG. 6a, in accordance with aspects of this disclosure.

FIG. 6b is a block diagram showing example components of the manifold regulator 600. In the example of FIG. 6b, the manifold regulator 600 includes three manifold inlets 402 in fluid communication with a manifold outlet 404 through three valves 206 and three one-way check valves 406. In some examples, the fluid communication lines between the check valves 406 and the manifold outlet 404 may serve as a mixing chamber when fluids are received from multiple manifold inlets 402. In some examples, an additional check valve 406 may be placed between the manifold outlet 404 and all the other check valves 406. In such an example, the fluid communication lines between the additional check valve 406 and the other check valves 406 may serve as the mixing chamber.

In the example of FIG. 6b, the manifold regulator 600 has a valve 206 in the fluid flow path between each manifold inlet 402 and its corresponding check valve 406. In some examples, some or all of the check valves 406 may instead be positioned upstream of the valves 206. As shown, each valve 206 has an actuator 220. In some examples, the actuator 220 may be omitted, as discussed above.

In the examples of FIG. 6b, pressures sensors 208 of the manifold regulator 600 are in fluid communication with each manifold inlet 402 and manifold outlet 404. In some examples, the pressure sensors 208 may be configured to measure a fluid pressure at each manifold inlet 402 and/or the manifold outlet 404. Though four pressure sensors 208 are shown in the example of FIG. 6b, in some examples more or fewer pressure sensors 208 may be used. In some examples, an additional pressures sensor 208 may be used to measure pressure at the mixing chamber of the manifold regulator 600.

In the example of FIG. 6b, the manifold regulator 600 includes three manifold ports 414 and three manifold antennas 416. In some examples, the manifold ports 414 and/or manifold antennas 416 may be similar to the manifold ports 414 and/or manifold antennas 416 described above with respect to the smart manifold 400. As shown, each manifold port 414 is electrically connected to the remote device 250 through a wired connection (e.g., with a corresponding device port 264). In some examples, each manifold antenna 416 may be in communication with the remote device (e.g., via a wireless connection with a corresponding device antenna 266). In some examples, fewer or more manifold ports 414 and/or manifold antennas 416 may be used. In some examples, only one manifold port 414 and/or manifold antenna 416 may be used.

While the manifold regulator 600 has been shown and described as connecting directly to the fluid tanks 106, with no intervening smart regulator 200, in some examples, the manifold regulator 600 may be used with one or more smart regulators 200, similar to the smart manifold 400. For example, the remote device 250 may employ separate communication channels to communicate with the smart regulators 200 and the manifold regulator 600. In some examples, the manifold ports 414 and/or manifold antennas 416 of the manifold regulator 600 may be employed to communicate with the smart regulators 200. In some examples, additional manifold ports 414 and/or manifold antennas 416 may be added to the manifold regulator 600 to implement his communication.

In the example of FIG. 6b, the manifold regulator 600 also includes a manifold UI 418, manifold control circuitry 412, and manifold communication circuitry 410. As shown, the pressure sensors 208, valves 206, manifold UI 418, manifold communication circuitry 410, manifold control circuitry 412, manifold ports 414, and manifold antennas 416 are in electrical communication with one another through a common electrical bus. In some examples, the pressure sensors 208, valves 206, manifold UI 418, manifold control circuitry 412, manifold communication circuitry 410, manifold ports 414, and manifold antennas 416 of the manifold regulator 600 may be similar to those described above with respect to the smart manifold 400.

In the example of FIG. 6b, the manifold control circuitry 412 includes manifold processing circuitry 422 and manifold memory circuitry 424. In some examples, the manifold processing circuitry 422 may include one or more processors. In some examples, the manifold memory circuitry 424 may store machine readable instructions configured for execution by the regulator processing circuitry 222 and/or one or more processors. As shown, the manifold memory circuitry 424 includes a manifold regulator process 700a, discussed further below.

Figure 7:
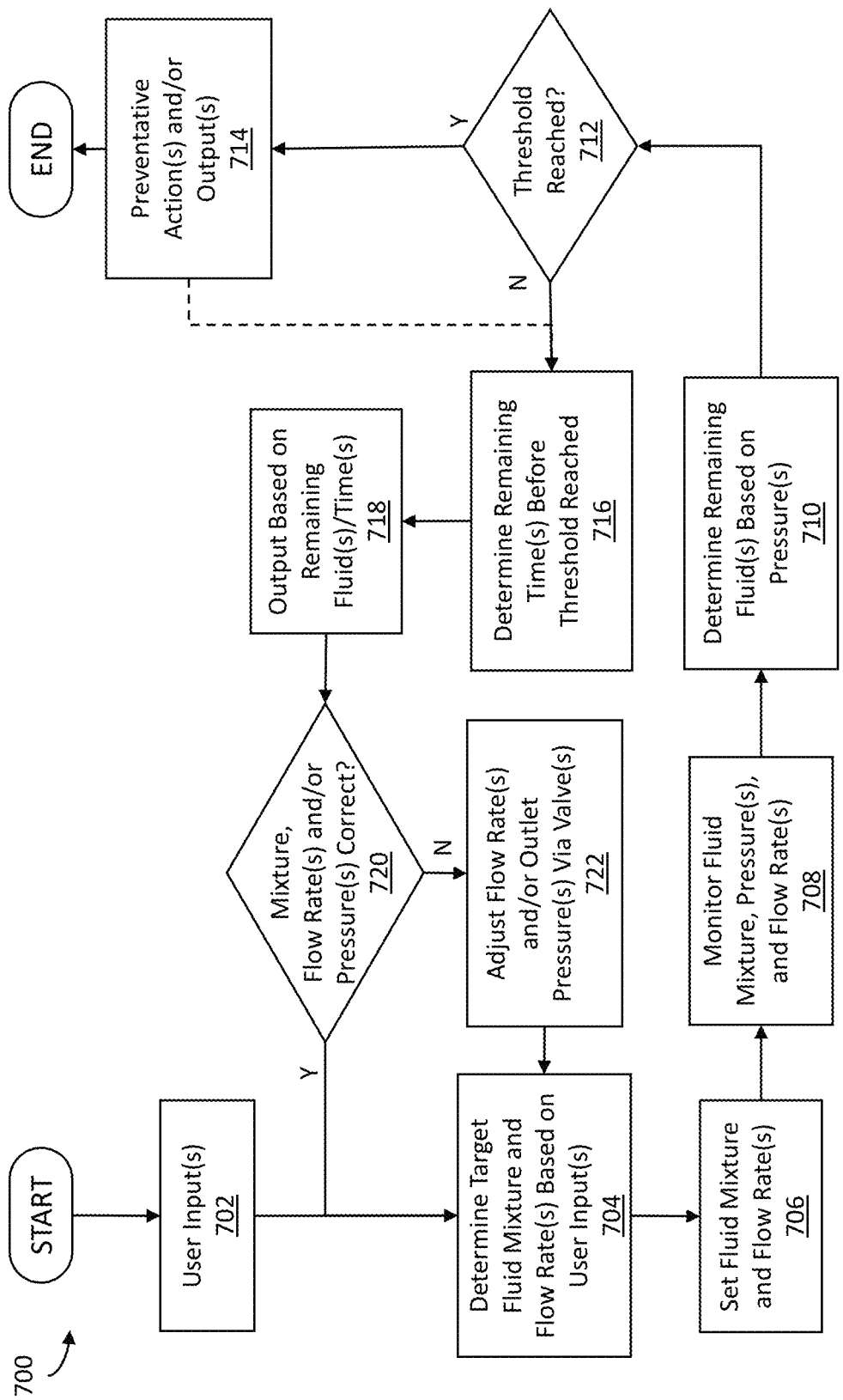
FIG. 7 is a flow diagram illustrating an example manifold regulator process, in accordance with aspects of this disclosure.

FIG. 7 is a flow diagram illustrating an example operation of the manifold regulator process 700. While the manifold regulator process 700 is illustrated as being stored in the manifold memory circuitry 424 and/or device memory circuitry 274 in FIGS. 2b and 6b, in some examples, the manifold regulator process 700 may alternatively, or additionally, be implemented via discrete circuitry of the manifold control circuitry 412 and/or device control circuitry 262. In some examples, the manifold regulator process 700 may be implemented via machine readable instructions stored in the manifold memory circuitry 424 and/or device memory circuitry 274. While illustrated as a single process in the example of FIG. 7 for the sake of clarity and simplicity, in some examples, portions of the manifold regulator process 700 may be separately performed and/or executed by the manifold regulator 600 and/or the remote device 250. In some examples, the manifold regulator process 700 may be executed as part of, or in parallel with, a larger welding-type process.

In the example of FIG. 7, the manifold regulator process 700 begins at block 702. At block 702, the user provides one or more inputs. In some examples, the input(s) may be provided via the UI 268 of the remote device 250 and/or the UI 418 of the manifold regulator 600. In some examples, the user input(s) may include, for example, a welding-type process, welding-type operation, material of workpiece 112, positioning of workpiece 112, tool type, fluid types, fluid tank sizes, fluid tank brands, fluid tank identifiers, full fluid tank pressures, threshold information, target flow rates, target outlet pressures, target fluid mixture, target use time(s), and/or other relevant information. In some examples, some of the user inputs (e.g., fluid type, fluid tank size, target flow rate, etc.) may be correlated with a particular inlet 402, valve 206, and/or pressure sensor 208.

In the example of FIG. 7, the manifold regulator process 700 proceeds to block 704 after block 702. At block 704, the manifold regulator process 700 determines a target fluid mixture based on the user input(s) received at block 702. For example, the target fluid mixture may comprise one hundred percent of a particular fluid, or a certain percentage of several different fluids (e.g., 25% of fluid A and 75% of fluid B). In some examples, the manifold regulator process 700 may determine the target mixture from direct user input (e.g., of the target mixture), or derive the target mixture from other user input (e.g., welding-type process, welding-type operation, material of workpiece 112, etc.).

At block 704, the manifold regulator process 700 additionally determines target flow rates through the manifold regulator 600 for each of the fluid tanks 106 connected to the manifold regulator 600. In some examples, the manifold regulator process 700 may determine the target flow rates based on the user input(s) received at block 702 and/or the target mixture determined at block 704. For example, the user may directly input target flow rates, and the manifold regulator process 700 may determine that one or more of these are appropriate target flow rates (e.g., within some known, stored, and/or previously determined range).

As another example, the manifold regulator process 700 may determine one or more recommended target flow rates based on other user entered information (e.g., welding-type process, welding-type operation, positioning, tool type, target time, fluid types, target fluid mixture, fluid tank sizes, etc.). In some examples, the manifold regulator process 700 may determine one or more other parameters (e.g., target fluid mixture, target use time, etc.) based on user entered information (e.g., welding-type process, welding-type operation, fluid type(s), etc.). Thereafter, the manifold regulator process 700 may determine the target flow rate(s) based on the parameter(s) and/or other user entered information. In some examples, the manifold regulator process 700 may prompt for (and/or receive) user approval (e.g., via UI 268 and/or UI 418) prior to proceeding with a recommended target flow rate.

In some examples, the manifold regulator process 700 may additionally, or alternatively, determine a target pressure of the manifold outlet 404 to achieve the target flow rate. In some examples, a target pressure of the manifold outlet 404 may be determined relative to each manifold inlet 402. In some examples, one or more signals indicative of the target flow rates (and/or target pressure(s)) may be communicated to and/or from the manifold regulator 600 and/or remote device 250. In some examples, the UI 268 of the remote device 250 and/or the UI 418 of the manifold regulator 600 may provide one or more outputs indicative of the target flow rate (and/or target pressure).

In some examples, the manifold regulator process 700 may only allow one valve 206 to be open at a time. Thus, in some examples, the manifold regulator process 700 may additionally determine a timing sequence for the flow rate(s) and/or outlet pressure relative to each manifold inlet 402 and/or valve 206 at block 704. For example, the manifold regulator process 700 may schedule valve 206a to open to achieve a target flow rate x1 for y1 amount of time, then valve 206c to open to achieve a target flow rate x2 for y2 amount of time, then valve 206b to open to achieve a target flow rate x3 for y3 amount of time, then valve 206c to open again to achieve a target flow rate x4 for y4 amount of time, and so on, and so forth. In some examples, the flow schedule may be set to loop until some threshold is reached or new input provided.

In some examples, the manifold regulator process 700 may schedule valve 206a to open to achieve a target flow rate x1 until some threshold amount in the fluid tank 106, or time remaining, is reached, at which point the valve 206a may be closed and valve 206b opened. For example, the manifold regulator process 700 may determine that the user entered welding-type process and/or operation calls for a certain fluid (and/or flow rate), and determine that valves 206*a* and 206*b* control fluid flow from fluid tanks 106 with that fluid (e.g., based on user entered information). Thereafter, the manifold regulator process 700 may automatically control valve 206*a* to achieve the target flow rate until the threshold amount or time is reached, then automatically switch to the other fluid tank 106 with the appropriate fluid to ensure continual fluid flow.

In the example of FIG. 7, the manifold regulator process 700 proceeds to block 706 after block 704. At block 706, the manifold regulator process 700 sets the flow rates of the manifold regulator 600 according to the target flow rates determined at block 704. In some examples, the setting of the flow rate may comprise setting one or more valves 206 (e.g., via the actuator(s) 220) to achieve the target flow rate through the valve 206. In some examples, setting the valve(s) 206 may comprise sending one or more electrical signals to the valve(s) 206 and/or actuator(s) 220.

In the example of FIG. 7, the manifold regulator process 700 proceeds to block 708 after block 706. At block 708, the manifold regulator process 700 monitors and/or measures the fluid mixture, flow rate(s), and/or pressure(s) of the manifold regulator 600. In some examples, the manifold regulator 600 may include a gas sensor in fluid communication with the mixing chamber (and electrical communication with the common bus), and the manifold regulator process 700 may monitor and/or measure the composition of the fluid mixture in the mixing chamber via the gas sensor. In some examples, the manifold regulator process 700 may monitor and/or measure the pressure(s) at the manifold inlets 402 and/or manifold outlet 404 via the pressure sensors 208. In some examples, a pressure in the mixing chamber may also be measured.

In some examples, one or more measurement signals representative of the measured fluid mixture and/or pressure(s) may be transmitted from the manifold regulator 600 to the remote device 250 via one or more communication channels. In some examples, the UI 418 of the manifold regulator 600 and/or UI 268 of the remote device 250 may provide one or more outputs representative of the measured mixture and/or pressure(s). In some examples, the measured mixture and/or pressure(s) may be stored in manifold memory circuitry 424 and/or device memory circuitry 274, along with a timestamp.

In the example of FIG. 7, the manifold regulator process 700 also determines one or more existing flow rates at block 708. In some examples, the flow rate(s) may be determined based on the pressure(s) measured at block 708. In some examples, this determination may be done by the remote device 250. In some examples, this determination may be done by the manifold regulator 600. In some examples, one or more signals indicative of the existing flow rates may be communicated to and/or from the manifold regulator 600 and/or remote device 250. In some examples, the UI 268 of the remote device 250 and/or the UI 418 of the manifold regulator 600 may provide one or more outputs indicative of the existing flow rate(s). In some examples, the existing flow rate(s) may be stored in regulator memory circuitry 224 and/or device memory circuitry 274, along with a timestamp.

In the example of FIG. 7, the manifold regulator process 700 proceeds to block 710 after block 708. At block 710, the manifold regulator process 700 determines (and/or estimates) a remaining amount of fluid in each fluid tank 106 connected to the manifold regulator 600. In some examples, the operation of block 710 largely mirrors that of block 310 of the fluid control process 300 for each fluid tank 106. In the interest of brevity, a duplicate description of this block is omitted.

In the example of FIG. 7, the manifold regulator process 700 proceeds to block 712 after block 710. At block 712, the manifold regulator process 700 determines whether the remaining amount of fluid in the fluid tank(s) 106 connected to the manifold regulator 600 is below a threshold level. In some examples, this determination may be made for each fluid tank 106 connected to the manifold regulator 600. In some examples, the threshold level may be stored in manifold memory circuitry 424 and/or device memory circuitry 274. In some examples, the threshold level may be input by the user at block 702. In some examples, the threshold level may be set at a default level (e.g., 10% left) if no threshold is input by the user.

In the example of FIG. 7, the manifold regulator process 700 proceeds to block 714 after block 712 if the manifold regulator process 700 determines that the threshold level has been reached. In some examples, the manifold regulator process 700 may only proceed to block 714 if the threshold has been reached for all of the fluid tanks 106 connected to the manifold regulator 600. In some examples, the manifold regulator process 700 may proceed to block 714 if the threshold has been reached for any of the fluid tanks 106 connected to the manifold regulator 600. In some examples, the manifold regulator process 700 may proceed to block 714 if the threshold has been reached for a threshold number of the fluid tanks 106 connected to the manifold regulator 600. In some examples, the operation of block 714 largely mirrors that of block 314 of the fluid control process 300. In the interest of brevity, a duplicate description of this block is omitted.

In the example of FIG. 7, the manifold regulator process 700 ends after block 714. However, as shown, in some examples, the manifold regulator process 700 may proceed to block 716 after block 714, instead of ending. As shown, the manifold regulator process 700 also proceeds to block 716 after block 712 if the remaining amount of fluid determined at block 710 is above the threshold level for all or some of the fluid tanks 106.

In some examples, the operation of block 716 largely mirrors that of block 316 of the fluid control process 300 for each fluid tank 106. In the interest of brevity, a duplicate description of this block is omitted. In the example of FIG. 7, the manifold regulator process 700 proceeds to block 718 after block 716.

In some examples, the operation of block 718 largely mirrors that of block 318 of the fluid control process 300 for each fluid tank 106. In the interest of brevity, a duplicate description of this block is omitted. In the example of FIG. 7, the manifold regulator process 700 proceeds to block 720 after block 718.

In the example of FIG. 7, the manifold regulator process 700 compares the existing mixture, flow rate(s), and/or pressure measurements with the target mixture, flow rate(s), and/or pressure(s). Based on this comparison, the manifold regulator process 700 determines whether the existing mixture, flow rate(s), and/or pressure(s) are correct (and/or within some input and/or stored threshold range). In some examples, the determination may occur at the manifold regulator 600. In some examples, this determination is performed at the remote device 250, and the remote device 250 sends one or more signals indicative of the determination result to the manifold regulator 600.

In the example of FIG. 7, the manifold regulator process 700 proceeds to block 722 after block 720 if the manifold regulator process 700 determines that one or more of the existing mixture, flow rate(s), and/or pressure(s) are incorrect (and/or outside of a threshold range). At block 722, the manifold regulator process 700 determines and/or makes one or more adjustments to the valve(s) 206 (e.g., via the actuator(s) 220) to achieve the target mixture, flow rate(s), and/or pressure(s). In some examples, making one or more adjustments to the valve(s) 206 to correct the fluid flow may comprise sending one or more electrical signals to the valve(s) 206 and/or actuator(s) 220.

In the example of FIG. 7, the manifold regulator process 700 returns to block 704 after block 722. As shown, the manifold regulator process 700 also returns to block 704 after block 720 if the manifold regulator process 700 determines that the existing fluid mixture, flow rate(s), and pressure(s) match the target mixture, flow rate(s), and/or pressure(s) (and/or is within a threshold range).

The present disclosure contemplates smart regulators 200 that provide information regarding current pressure(s) and/or flow rate(s) that can be easily understood by an operator. In some examples, a remote device 250 may be used to provide the information to the operator. In some examples, remote device 250 may also use the information to warn when fluid in a fluid tank 106 is getting low.

The present disclosure also contemplates a smart manifold 400 and/or smart manifold regulator 600 configured to work with several different fluid tanks 106 and/or smart regulators 200. In this way, an operator may easily mix fluid types, switch between different fluid types, and/or switch between different fluid tanks 106. Additionally, the different fluid tank 106 connections of the smart manifold 400 may allow for tools that have traditionally had different air/gas connectors to all use the same connector.

The present methods and systems may be realized in hardware, software, and/or a combination of hardware and software. A typical combination of hardware and software may include a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein. As used herein, the term "non-transitory machine-readable medium" is defined to include all types of machine readable storage media and to exclude propagating signals.

As used herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z".

As used herein, the terms "approximate" and/or "approximately," when used to modify or describe a value (or range of values), position, shape, orientation, and/or action, mean reasonably close to that value, range of values, position, shape, orientation, and/or action. Thus, the examples described herein are not limited to only the recited values, ranges of values, positions, shapes, orientations, and/or actions but rather should include reasonably workable deviations.

As utilized herein, the terms "e.g.," and "for example" set off lists of one or more non-limiting examples, instances, or illustrations.

As used herein, the terms "couple," "coupled," "attach," "attached," "connect," and/or "connected" refer to a structural and/or electrical affixing, joining, fasten, linking, and/or other securing.

As utilized herein the terms "circuits" and "circuitry" refer to physical electronic components (i.e. hardware) and/or any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code.

As utilized herein, circuitry is "configured" to perform a function whenever the circuitry comprises the necessary hardware and code (if any is necessary) to perform the function, regardless of whether performance of the function is disabled or not enabled (e.g., by a user-configurable setting, factory trim, etc.).

As used herein, a control circuit may include digital and/or analog circuitry, discrete and/or integrated circuitry, microprocessors, DSPs, etc., software, hardware and/or firmware, located on one or more boards, that form part or all of a controller, and/or are used to control a welding process, and/or a device such as a power source or wire feeder.

As used herein, the term "processor" means processing devices, apparatus, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC). The processor may be coupled to, and/or integrated with a memory device.

As used, herein, the term "memory" and/or "memory device" means computer hardware or circuitry to store information for use by a processor and/or other digital device.

The memory and/or memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like.

The term "power" is used throughout this specification for convenience, but also includes related measures such as energy, current, voltage, and enthalpy. For example, controlling "power" may involve controlling voltage, current, energy, and/or enthalpy, and/or controlling based on "power" may involve controlling based on voltage, current, energy, and/or enthalpy.

As used herein, welding-type power refers to power suitable for welding, cladding, brazing, plasma cutting, induction heating, CAC-A and/or hot wire welding/preheating (including laser welding and laser cladding), carbon arc cutting or gouging, and/or resistive preheating.

As used herein, a welding-type power supply and/or power source refers to any device capable of, when power is applied thereto, supplying welding, cladding, brazing, plasma cutting, induction heating, laser (including laser welding, laser hybrid, and laser cladding), carbon arc cutting or gouging and/or resistive preheating, including but not limited to transformer-rectifiers, inverters, converters, resonant power supplies, quasi-resonant power supplies, switch-mode power supplies, etc., as well as control circuitry and other ancillary circuitry associated therewith.

As used herein, a welding-type tool refers to any tool capable of performing a welding, cladding, brazing, plasma cutting, induction heating, carbon arc cutting or gouging and/or resistive preheating operation.

Disabling of circuitry, actuators, and/or other hardware may be done via hardware, software (including firmware), or a combination of hardware and software, and may include physical disconnection, de-energization, and/or a software control that restricts commands from being implemented to activate the circuitry, actuators, and/or other hardware. Similarly, enabling of circuitry, actuators, and/or other hardware may be done via hardware, software (including firmware), or a combination of hardware and software, using the same mechanisms used for disabling.

While the present method and/or system has been described with reference to certain implementations, it will be understood by those skilled in the art that various changes may be made and equivalents may be substituted without departing from the scope of the present method and/or system. For example, blocks and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A smart manifold, comprising:
a first inlet configured for fluid communication with a first fluid supply;
a second inlet configured for fluid communication with a second fluid supply;
an outlet configured for fluid communication with a welding power supply, a wire feeder, or a welding-type tool;
a mixing chamber in fluid communication with the outlet, the first inlet, and the second inlet;
a first valve positioned in a first fluid flow path between the first inlet and the mixing chamber;
a second valve positioned in a second fluid flow path between the second inlet and the mixing chamber;
a valve actuator configured to adjust a first fluid flow restriction of the first valve based on a valve control signal, or adjust a second fluid flow restriction of the second valve based on the valve control signal; and
control circuitry configured to:
monitor a composition of a fluid mixture in the mixing chamber,
determine the valve control signal based on the composition of the fluid mixture in the mixing chamber and a target fluid mixture, and
provide the valve control signal to the first valve, the second valve, or the valve actuator.

2. The smart manifold of claim 1, further comprising:
a communication device in communication with a remote device, the remote device comprising the welding-type power supply, the wire feeder, the welding-type tool, a mobile device, an accessory device, a pendant, or a computing system,
wherein the control circuitry is further configured to:
receive a welding parameter from the remote device, the welding parameter comprising a fluid source, or a welding-type process, and
determine the valve control signal based on the composition of the fluid mixture in the mixing chamber, the target fluid mixture, and the welding parameter.

3. The smart manifold of claim 2, further comprising:
a first sensor configured to measure a first fluid flow characteristic at the first inlet; and
a second sensor configured to measure a second fluid flow characteristic at the second inlet,
wherein the control circuitry is configured to:
determine the valve control signal based on the first or second fluid flow characteristic, the composition of the fluid mixture in the mixing chamber, the target fluid mixture, and the welding parameter.

4. The smart manifold of claim 1, further comprising an enclosure housing the first valve, the second valve, the valve actuator, the mixing chamber, and the control circuitry.

5. The smart manifold of claim 1, further comprising communication circuitry configured to transmit the composition of the fluid mixture in the mixing chamber to a remote device.

6. The smart manifold of claim 1, further comprising:
a first one way check valve between the first valve and the mixing chamber, the first one way check valve configured to prevent reverse fluid flow from the mixing chamber to the first inlet; and
a second one way check valve between the second valve and the mixing chamber, the second one way check valve configured to prevent reverse fluid flow from the mixing chamber to the second inlet.

7. The smart manifold of claim 1, further comprising:
a first sensor configured to measure a first fluid flow characteristic at the first inlet;
a second sensor configured to measure a second fluid flow characteristic at the second inlet; and
a communication device in communication with a remote device,
the control circuitry being configured to:
determine a remaining amount of fluid in the first fluid supply or the second fluid supply based on the first fluid flow characteristic or the second fluid flow characteristic, and
in response to determining the amount of fluid in the first fluid supply or the second fluid supply is below a fluid threshold, (i) send an alert to the remote device via the communication device, (ii) send a disable signal to the welding-type power supply, the wire feeder, or the welding-type tool via the communication device, (iii) send a web address of a website where more fluid can be ordered to the remote device via the communication device, or (iv) automatically reorder more fluid.

8. A smart manifold, comprising:
a first inlet configured for fluid communication with a first fluid supply;
a second inlet configured for fluid communication with a second fluid supply;
an outlet configured for fluid communication with a welding power supply, a wire feeder, or a welding-type tool;
a mixing chamber in fluid communication with the outlet, the first inlet, and the second inlet;
a first valve comprising a first valve actuator configured to adjustably restrict fluid flow between the first inlet and the mixing chamber based on a first valve control signal;
a second valve comprising a second valve actuator configured to adjustably restrict fluid flow between the second inlet and the mixing chamber based on the first valve control signal or a second valve control signal; and
control circuitry configured to:
monitor a composition of a fluid mixture in the mixing chamber,
determine the first valve control signal or the second valve control signal based on the composition of the fluid mixture in the mixing chamber and a target fluid mixture, and
provide the first valve control signal or the second valve control signal to the first valve or the second valve.

9. The smart manifold of claim 8, further comprising:
a communication device in communication with a remote device, the remote device comprising the welding-type power supply, the wire feeder, the welding-type tool, a mobile device, an accessory device, a pendant, or a computing system,
wherein the control circuitry is further configured to:
receive a welding parameter from the remote device, the welding parameter comprising a fluid source or a welding-type process, and
determine the first valve control signal or the second valve control signal based on the composition of the fluid mixture in the mixing chamber, the target fluid mixture, and the welding parameter.

10. The smart manifold of claim 9, further comprising:
a first sensor configured to measure a first fluid flow characteristic at the first inlet; and
a second sensor configured to measure a second fluid flow characteristic at the second inlet,
wherein the control circuitry is configured to:
determine the first valve control signal or the second valve control signal based on the first or second fluid flow characteristic, the composition of the fluid mixture in the mixing chamber, the target fluid mixture, and the welding parameter.

11. The smart manifold of claim 8, further comprising an enclosure housing the first valve, the second valve, the mixing chamber, and the control circuitry.

12. The smart manifold of claim 8, further comprising communication circuitry configured to transmit the composition of the fluid mixture in the mixing chamber to a remote device.

13. The smart manifold of claim 8, further comprising:
a first one way check valve between the first valve and the mixing chamber, the first one way check valve configured to prevent reverse fluid flow from the mixing chamber to the first inlet; and
a second one way check valve between the second valve and the mixing chamber, the second one way check valve configured to prevent reverse fluid flow from the mixing chamber to the second inlet.

14. The smart manifold of claim 8, further comprising:
a first sensor configured to measure a first fluid flow characteristic at the first inlet;
a second sensor configured to measure a second fluid flow characteristic at the second inlet; and
a communication device in communication with a remote device,
the control circuitry being configured to:
determine a remaining amount of fluid in the first fluid supply or the second fluid supply based on the first fluid flow characteristic or the second fluid flow characteristic, and
in response to determining the amount of fluid in the first fluid supply or the second fluid supply is below a fluid threshold, (i) send an alert to the remote device via the communication device, (ii) send a disable signal to the welding-type power supply, the wire feeder, or the welding-type tool via the communication device, (iii) send a web address of a website where more fluid can be ordered to the remote device via the communication device, or (iv) automatically reorder more fluid.

15. A welding-type system, comprising:
a smart manifold, comprising:
a first inlet configured for fluid communication with a first fluid supply,
a second inlet configured for fluid communication with a second fluid supply,
an outlet configured for fluid communication with a welding power supply, a wire feeder, or a welding-type tool,
a mixing chamber in fluid communication with the outlet, the first inlet, and the second inlet,
a first valve positioned in a first fluid flow path between the first inlet and the mixing chamber,
a second valve positioned in a second fluid flow path between the second inlet and the mixing chamber,
a valve actuator configured to adjust a first fluid flow restriction of the first valve based on a valve control signal, or adjust a second fluid flow restriction of the second valve based on the valve control signal, and
control circuitry configured to:
monitor a composition of a fluid mixture in the mixing chamber,
determine the valve control signal based on the composition of the fluid mixture in the mixing chamber and a target fluid mixture, and
provide the valve control signal to the first valve, the second valve, or the valve actuator; and
a remote device in communication with the smart manifold, the remote device configured to send one or more device control signals representative of the target fluid mixture to the smart manifold.

16. The welding-type system of claim 15, wherein the one or more device control signals are further representative of a fluid source or a welding-type process.

17. The welding-type system of claim 15, further comprising:

a first sensor configured to measure a first fluid flow characteristic at the first inlet; and a second sensor configured to measure a second fluid flow characteristic at the second inlet, wherein the control circuitry is configured to:
determine the valve control signal based on the first fluid flow characteristic, or the second fluid flow characteristic, and the device control signals.

18. The welding-type system of claim 15, wherein the smart manifold further comprises: an enclosure housing the first valve, the second valve, the valve actuator, and the control circuitry.

19. The welding-type system of claim 15, wherein the smart manifold further comprises communication circuitry configured to: transmit the composition of the fluid mixture in the mixing chamber to the remote device.

20. The welding-type system of claim 15, wherein the smart manifold further comprises:
a first one way check valve positioned in the first fluid path between the first valve and the mixing chamber, the first one way check valve configured to prevent reverse fluid flow from the mixing chamber to the first inlet, and a second one way check valve positioned in the second fluid path between the second valve and the mixing chamber, the second one way check valve configured to prevent reverse fluid flow from the mixing chamber to the second inlet.

* * * * *